(12) United States Patent
Shimaya et al.

(10) Patent No.: US 6,495,747 B2
(45) Date of Patent: Dec. 17, 2002

(54) APPARATUS AND METHOD FOR EVALUATING MUSICAL PERFORMANCE AND CLIENT/SERVER SYSTEM THEREFOR

(75) Inventors: Hideaki Shimaya, Hamamatsu (JP); Akira Tozuka, Hamamatsu (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 09/748,448

(22) Filed: Dec. 26, 2000

(65) Prior Publication Data

US 2001/0039870 A1 Nov. 15, 2001

(30) Foreign Application Priority Data

Dec. 24, 1999 (JP) .......................................... 11-367326
Nov. 9, 2000 (JP) ........................................ 2000-341530

(51) Int. Cl.[7] ............................................. G09B 15/02
(52) U.S. Cl. .................................................... 84/477 R
(58) Field of Search ............................. 84/462, 470 R, 84/477 R, 478

(56) References Cited

U.S. PATENT DOCUMENTS 4,506,580 A * 3/1985 Koike ...................... 84/478 X
4,982,643 A * 1/1991 Minamitaka .......... 84/470 R X
5,092,216 A * 3/1992 Wadhams ................. 84/462 X
6,072,113 A * 6/2000 Tohgi et al. .............. 84/470 R
6,084,168 A * 7/2000 Sitrick ...................... 84/477 R
6,166,314 A * 12/2000 Weinstock et al. ..... 84/477 R X

FOREIGN PATENT DOCUMENTS

JP 6-19387 1/1994

* cited by examiner

Primary Examiner—Stanley J. Witkowski
(74) Attorney, Agent, or Firm—Rossi & Associates

(57) ABSTRACT

A performance evaluation apparatus presents a reference performance of a music piece for practice. The user inputs manual performance operations in tempo with the presented reference performance. The apparatus compares the inputted manual performance and the reference performance, and outputs an evaluation report as to the correctness of the manual performance with respect to the reference performance. In one embodiment, the apparatus is provided with an outputting condition designating device for the user to designate whether to output an evaluation report after the practice performance is over. In another embodiment, the apparatus is provided with an evaluation span designating device for the user to designate performance spans about which the user's practice performance is to be evaluated. The apparatus outputs an evaluation report according to the user's designation.

25 Claims, 21 Drawing Sheets

Fig. 4a Main Processing
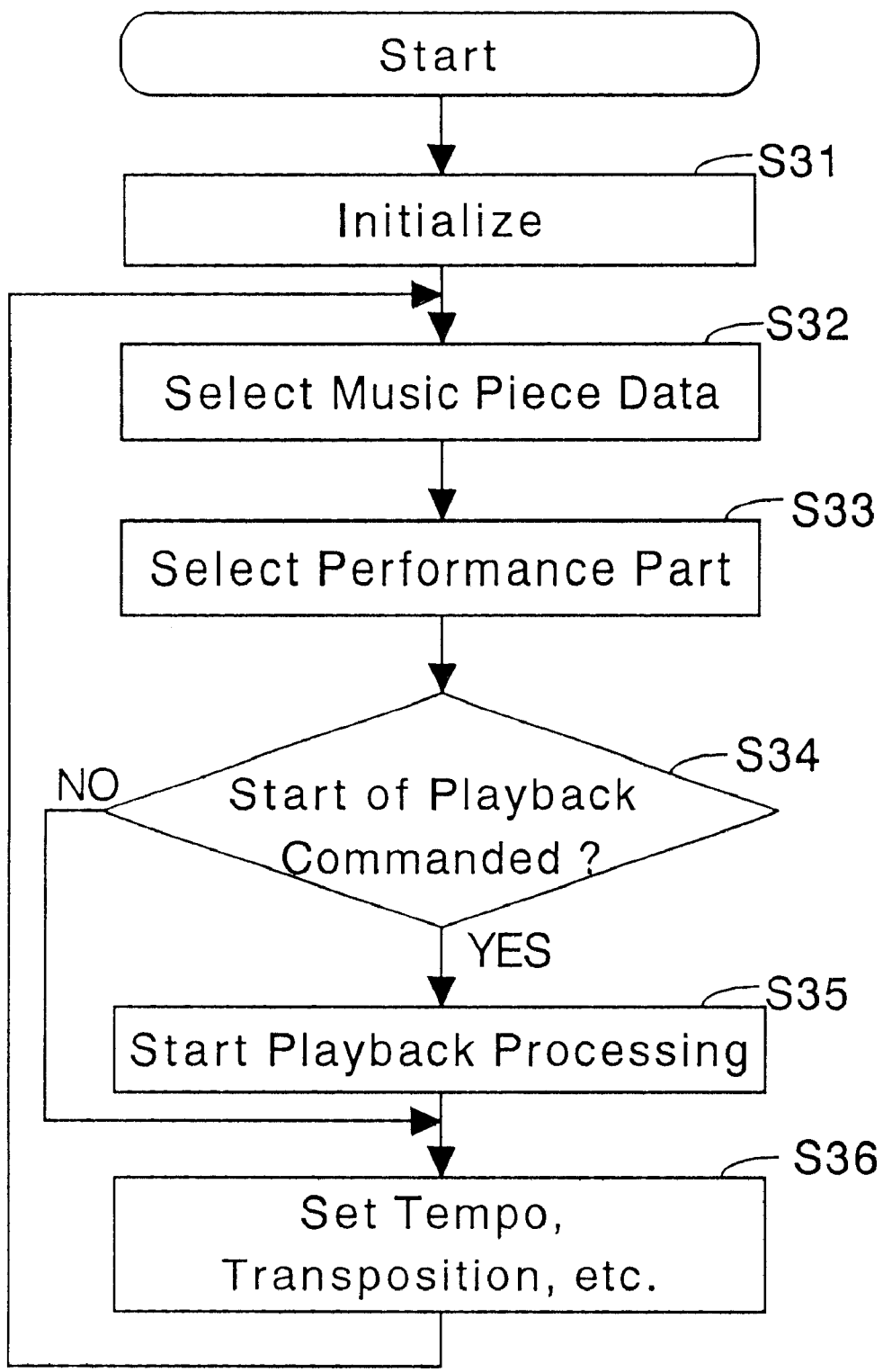

Fig. 4b Playback Processing
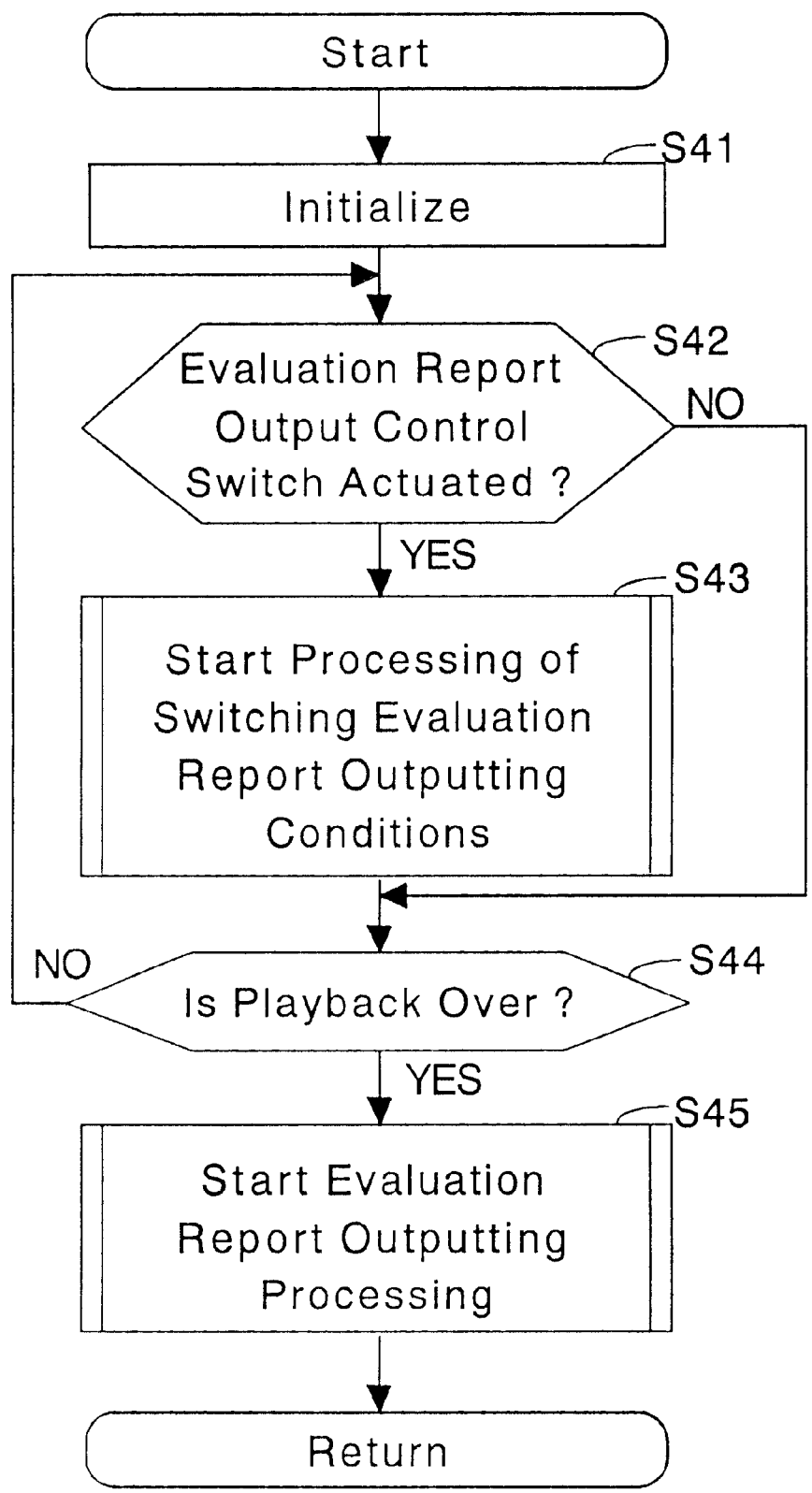

*Fig. 4c* Key Actuation Interrupt Processing during Playback Processing
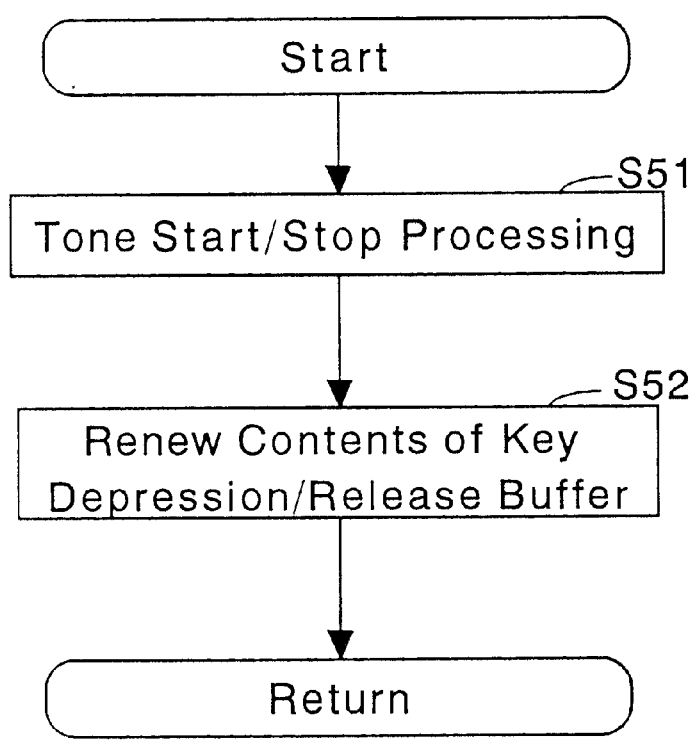

Fig. 5a Timing Interrupt Processing during Playback Processing
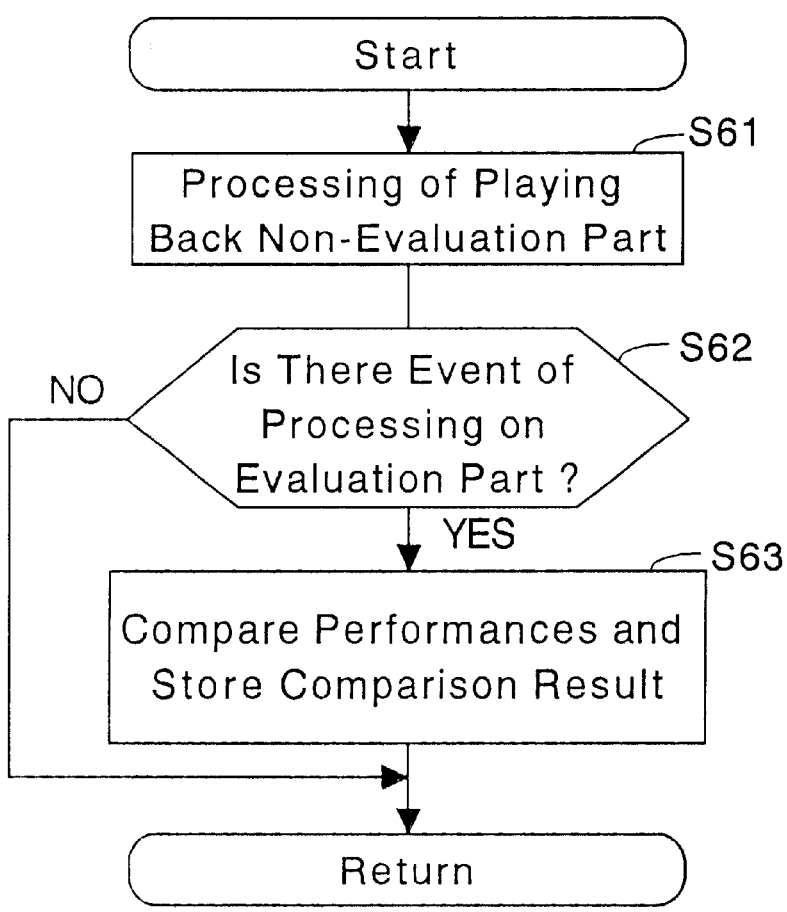

*Fig. 5b Processing of Switching Evaluation Report Outputting Conditions during Playback Processing*
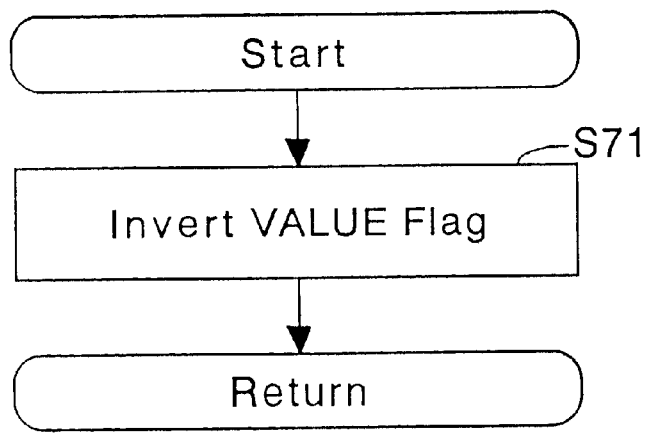

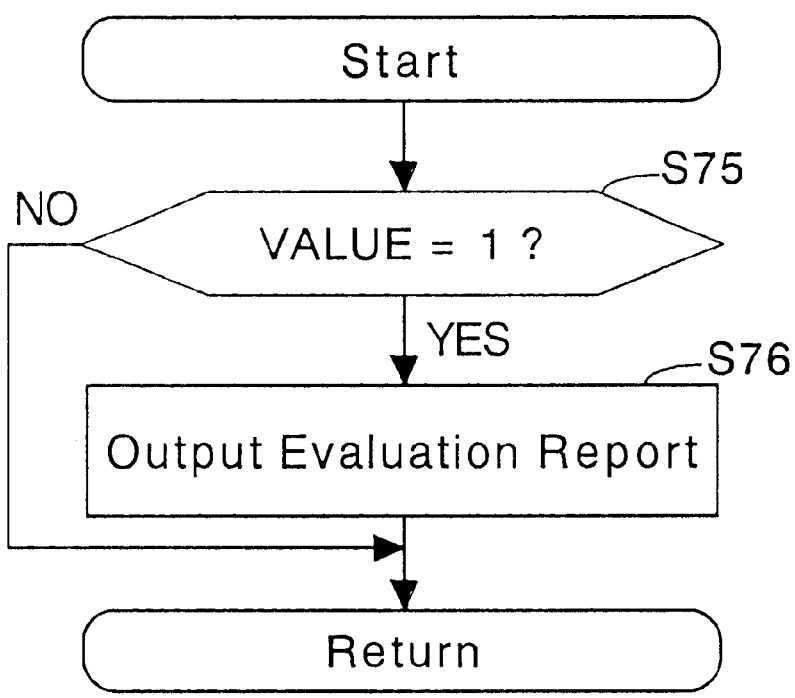
Fig. 5c Evaluation Report Outputting Processing

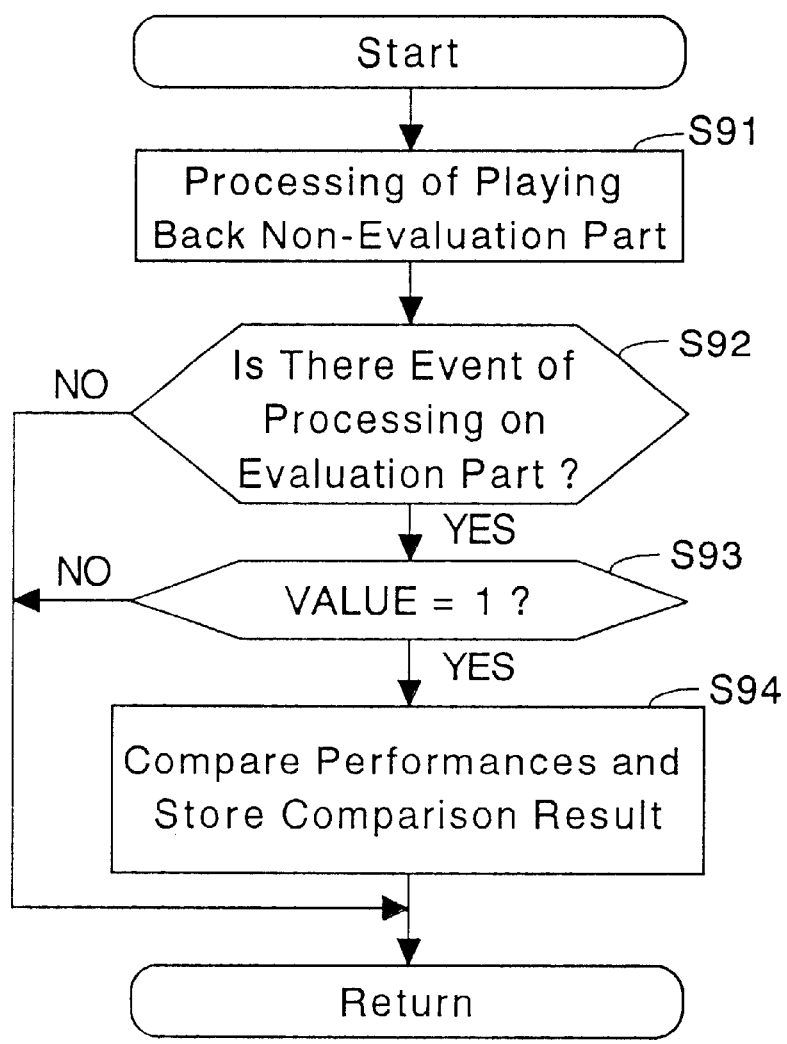
Fig. 8a Timing Interrupt Processing during Playback Processing

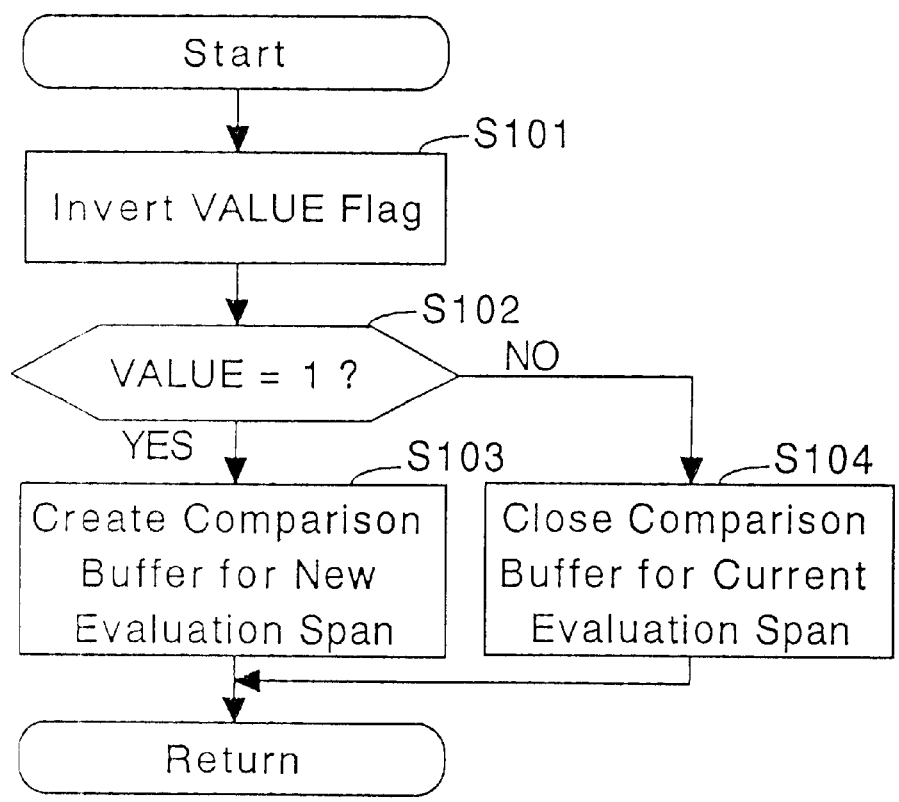
Fig. 8b Processing of Switching Evaluation Report Outputting Conditions during Playback Processing

Fig. 8c Evaluation Report Outputting Processing
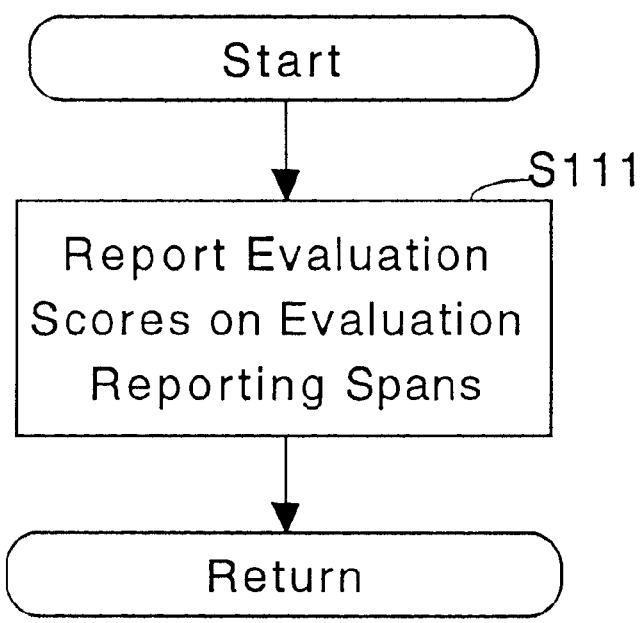

*Fig.10  Evaluation Report Output Span Designating Data File*

| Time Point = 0 |
|---|
| VALUE Flag = 0 |
| Time Point = 3 |
| VALUE Flag = 1 |
| Time Point = 10 |
| VALUE Flag = 0 |
| Time Point = 16 |
| VALUE Flag = 1 |

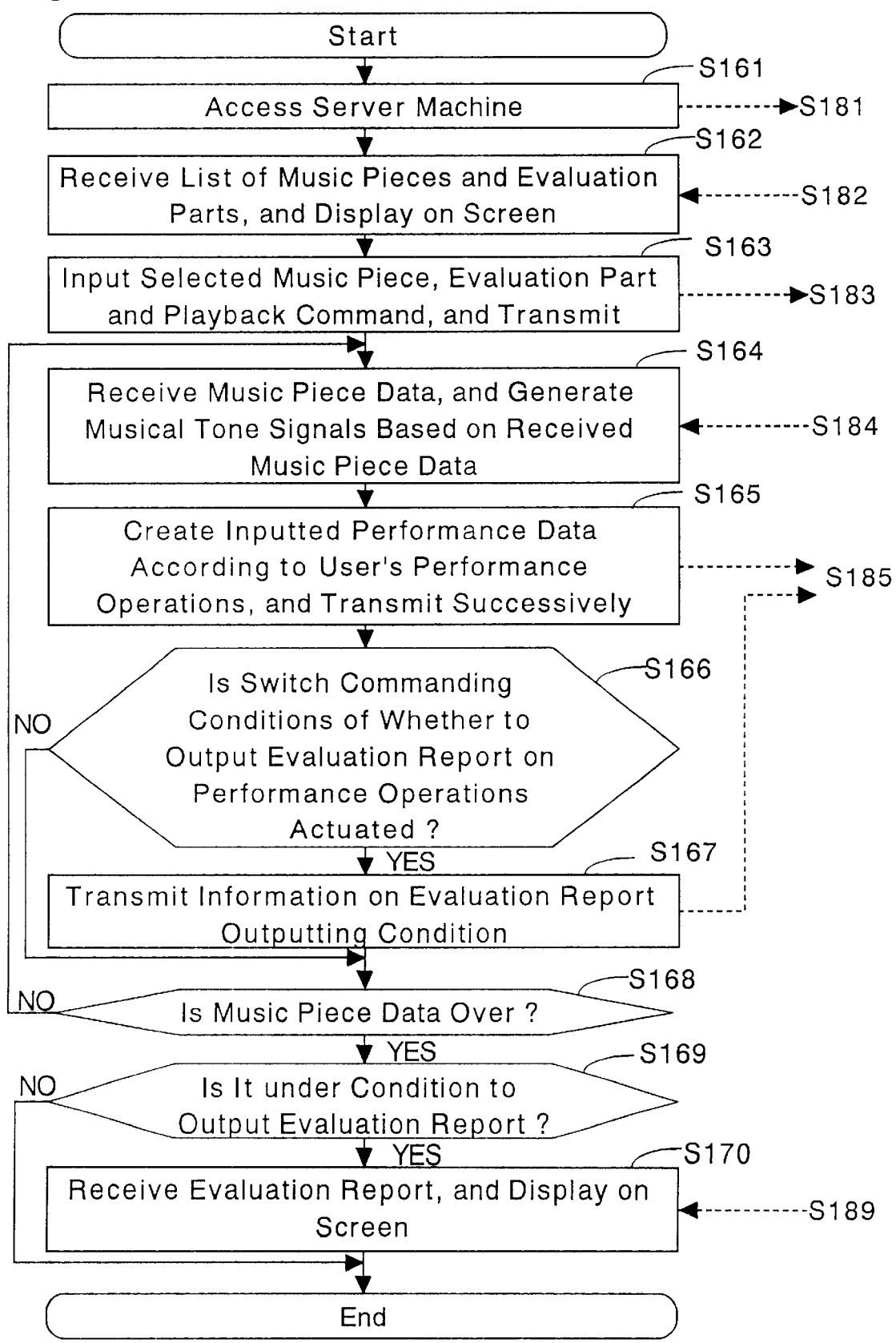
Fig.14a  Functions at Client Machine

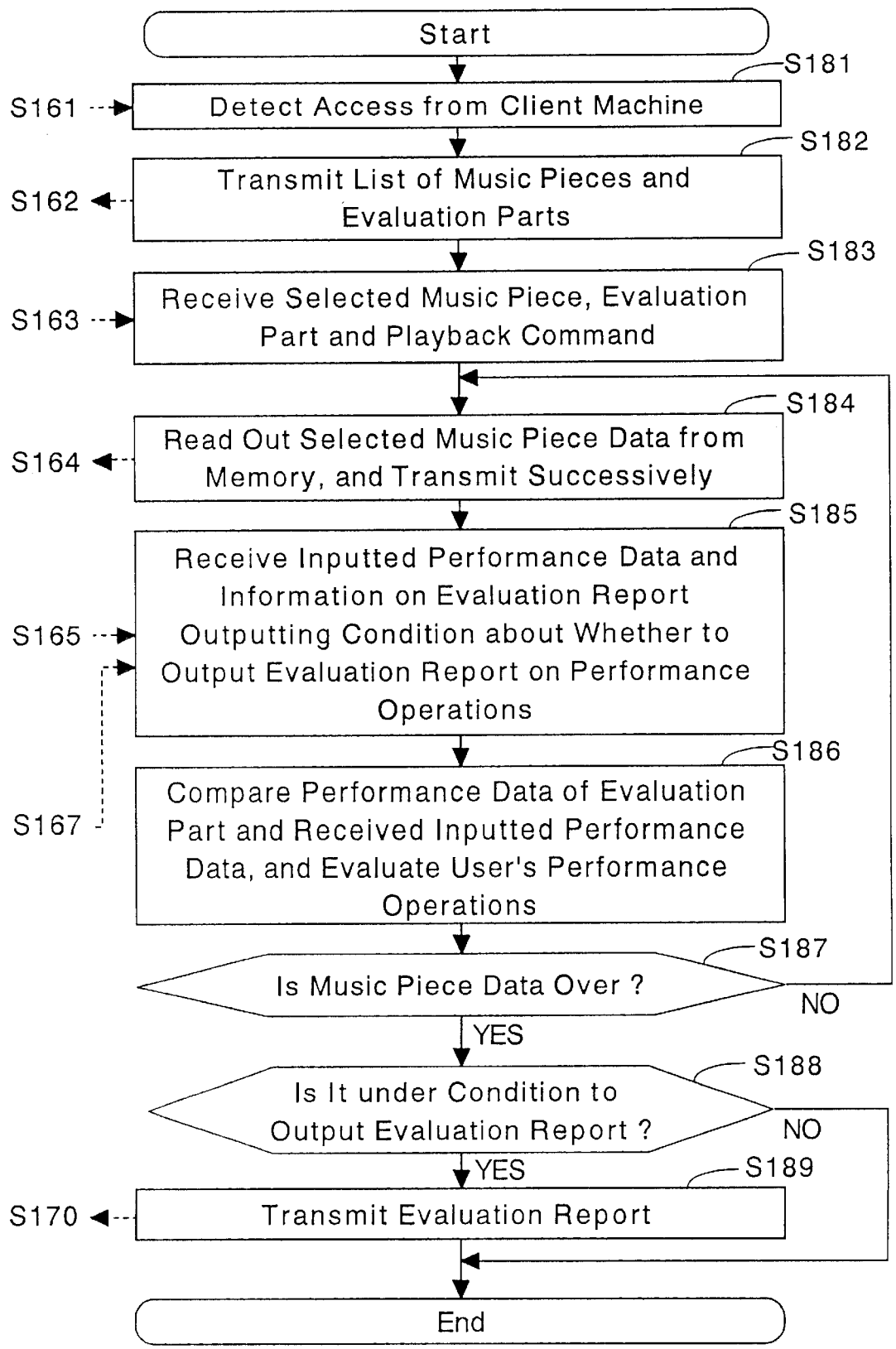

APPARATUS AND METHOD FOR EVALUATING MUSICAL PERFORMANCE AND CLIENT/SERVER SYSTEM THEREFOR

RELATED APPLICATION

This application claims priority from Japanese Patent Applications Nos. 11-367326 and 2000-341530, filed Dec. 24, 1999 and Nov. 9, 2000, respectively, the contents of which are incorporated hereinto by this reference.

BACKGROUND OF THE INVENTION

1. Field of the Invention

The present invention relates to an apparatus and a method for evaluating a practice musical performance by the user in comparison with a reference performance provided at the apparatus end, a storage medium containing a program therefor, and a client/server system architecture therefor.

2. Description of the Prior Art

There has conventionally been known in the art apparatuses for evaluating a user's manual performance of music comparing with a reference musical performance of which music piece data are stored in an appropriate memory. A type of such apparatus is a dedicated training apparatus exclusively designed for training a pupil or user, and is so structured that the data of the pupil's manual performance operations are instantaneously processed according to the installed program for training so as to instantaneously notify the evaluation to the pupil, so that the pupil cannot practice playing freely from the beginning till the end of a piece of music or at a particularly intended span without minding (i.e. being interrupted by) the evaluation results. Another type of such apparatus is an electronic musical instrument equipped with an evaluation faculty on which a pupil can freely practice a manual performance without interruption by the apparatus in the midst of the performance, but the pupil has to set the instrument at the mode for evaluation and designate whether an evaluation report is to be outputted with respect to the pupil's manual performance, before the playback of the music piece data of the reference performance is started.

However, in the latter type of apparatus, once the playback of the music piece data of the reference performance has been started, the user cannot change the setting for whether to output an evaluation report or not in the midst of the performance or after the end of the performance, even in the case where the user wants an output of the evaluation report during the actual manual performance or in the case where the user has once requested a performance evaluation but later gives up getting a performance evaluation. For this reason, when the user gives up getting an evaluation report after he/she has set the apparatus to output an evaluation report, and when the user wants to have an evaluation report output after he/she has started a manual performance with the setting of no evaluation report output, the user has to stop the playback of the music piece data in the middle way to restart the playback of the music piece data as well as his/her manual performance from the beginning, which is very inconvenient for the user. And even in the case of an apparatus on which a performance of a fractional portion of a music piece is acceptable, the evaluation report is on the whole length of the inputted performance. Therefore, after a length of manual performance has been inputted, the user cannot get the evaluation about a particular portion or portions within the non-chopped performance. That is, the user may not obtain a suitable evaluation report as wanted.

SUMMARY OF THE INVENTION

It is, therefore, a primary object of the present invention to solve the above-mentioned drawbacks involved in such conventional apparatuses and to provide an improved apparatus and method for evaluating a musical performance and a client/server system therefor as well as a storage medium containing a computer program executing processes therefor. According to the invention, a user can designate an output of an evaluation report at any arbitrary timing in the midst of the playback of a musical performance or after the playback of a musical performance. Further, a user can designate particular performance spans about which evaluation reports are to be outputted.

In order to accomplish the object of the present invention, a first aspect of the present invention provides a musical performance evaluating apparatus comprising: a reference performance data providing device which provides a reference performance data representing a musical performance as a reference for evaluation; a manual performance input device for inputting manual performance operations by a user and outputting manual performance data representing the inputted performance operations to be evaluated; an evaluation device which compares the manual performance data with the reference performance data; an evaluation report output device which outputs an evaluation report based on the comparison by the evaluation device; an evaluation report outputting condition designating device which designates a condition whether to output an evaluation report according to a control operation by the user; and an evaluation report output control device which controls the evaluation report output device to output the evaluation report after the performance operations have finished, when the evaluation report outputting condition designating device is designating the condition to output an evaluation report. In the above-mentioned structure of a performance evaluating apparatus, the reference performance data providing device may include a music piece data memory which stores music piece data including the reference performance data, and a music piece data readout device which reads out the music piece data including the reference performance data successively from said music piece data memory to play back the reference performance. The reference performance data providing device may includes a music piece data inputting device for inputting music piece data including the reference performance data so that the reference performance data can be inputted externally. In the latter case, the music piece data may be obtained via a communication network from a server machine in the network. The transmission may be a batch transmission or may be a real time transmission along with the playback of the performance.

According to the above-mentioned musical performance evaluating apparatus of the first aspect of the invention, the user can arbitrarily determine whether to output an evaluation report or not, by controlling the evaluation report outputting condition designating device very easily. The designation can be entered at any arbitrary time in the midst of the performance operations or after the performance operations have finished. The evaluation report outputting condition designating device may preferably hold the designated condition according to the control operation every time there is a control operation, so that the user is allowed to reconsider the designation, even during the performance is running.

A second aspect of the present invention provides a storage medium for use in an apparatus for evaluating a musical performance, the apparatus being of a data processing type comprising a computer, the medium containing a program that is executable by the computer, the program comprising: a module for providing a reference performance data representing a musical performance as a reference for evaluation; a module for inputting manual performance operations by a user and outputting manual performance data representing the inputted performance operations to be evaluated; a module for comparing the input performance data with the reference performance data; a module for outputting an evaluation report based on the comparison by the comparing module; a module for designating a condition whether to output an evaluation report according to a control operation by the user; and a module for controlling the function of the outputting module to output the evaluation report after the performance operations have finished, when the designating module is designating the condition to output an evaluation report.

As will be apparent from the above description, the computer programs are useful for realizing a musical performance evaluating apparatus within the spirit of the present invention by installing such a program in a data processing apparatus or in an electronic musical instrument incorporating a computer so that an embodiment of the above-described first aspect of the present invention can be easily configured.

A third aspect of the present invention provides a client/server system for evaluating a musical performance. A server machine comprises: a connecting device for connecting the server apparatus to a communication network to be available for an access from a client apparatus; a reference performance data providing device which provides reference performance data representing a musical performance as a reference for evaluation; a manual performance data receiving device which receives, via the connecting device, a manual performance data representing inputted performance operations at the client apparatus; an evaluation device which compares the manual performance data with the reference performance data; an evaluation report output device which outputs an evaluation report based on the comparison by the evaluation device; an evaluation report output control device which controls the evaluation report output device to output the evaluation report after the performance operations have finished, when evaluation report outputting condition designating information received from the client apparatus via the connecting device is designating the condition to output an evaluation report; and an evaluation report transmitting device which transmits the evaluation report to the client via the connecting device. The reference performance data providing device may include a music piece data inputting device for inputting a music piece data including the reference performance data. A client machine comprises: a connecting device for connecting the client apparatus to a communication network to access a server apparatus; a reference performance data receiving device for receiving via the connecting device a music piece data including a reference performance data representing a musical performance as a reference for evaluation; a manual performance input device for inputting manual performance operations by a user and outputting manual performance data representing the inputted performance operations to be evaluated; a manual performance data outputting device which outputs the manual performance data to the communication network via the connecting device; an evaluation report outputting condition designating device which designates a condition whether to output an evaluation report according to a control operation by the user, and outputs information about the designated condition to the communication network via the connecting device such that the server apparatus outputs an evaluation report with respect to the manual performance data against the reference performance data after the performance operations have finished, when the information about the designated condition is designating the condition to output an evaluation report; and an evaluation report receiving device which receives the evaluation report from the server apparatus via the connecting device.

According to the above-mentioned client/server system for evaluating a musical performance of the third aspect of the invention, the user inputs a practice performance, i.e. manual performance operations at the client machine and the server machine evaluates the user's performance and notifies to the client machine. The user may input a designation of whether to output an evaluation report or not by the end of his/her performance operations. As the server can be a large scale machine and therefore can process a high level of evaluation (precise, high-speed, detailed, versatile, etc.), the client machine can be free from heavy-load processing. Where the server stores music piece data of reference performances and delivers a requested performance data to the client, the client machine does not have to prepare a big database of music piece data. Alternatively, however, the reference performance database may be prepared in the client machine, so that the user can easily and quickly select any desired music piece for practice at the user's end.

A fourth aspect of the present invention provides a storage medium for use in a client machine for evaluating a musical performance, the machine being of a data processing type comprising a computer and having a connecting device to connect the machine to a communication network, the medium containing a program that is executable by the computer, the program comprising: a module for connecting the client machine to a communication network to access a server machine; a module for receiving via the connecting device a music piece data including a reference performance data representing a musical performance as a reference for evaluation; a module for inputting manual performance operations by a user and outputting manual performance data representing the inputted performance operations to be evaluated; a module for outputting the manual performance data to the communication network via the connecting device; a module for designating a condition whether to output an evaluation report according to a control operation by the user, and outputs information about the designated condition to the communication network via the connecting device such that the server machine outputs an evaluation report with respect to the manual performance data against the reference performance data after the performance operations have finished, when the information about the designated condition is designating the condition to output an evaluation report; and a module for receiving the evaluation report from the server machine via the connecting device. With this program, the client machine will work as a practice station for users, having evaluation faculty and being connected to the server machine via a communication network.

In order to accomplish the object of the present invention, a fifth aspect of the present invention provides a musical performance evaluating apparatus comprising: a reference performance data providing device which provides a reference performance data representing a musical performance as a reference for evaluation; a manual performance input device for inputting manual performance operations by a user and outputting input performance data representing the inputted performance operations to be evaluated; an evaluation device which compares the manual performance data with the reference performance data; an evaluation report output device which outputs an evaluation report based on the comparison by the evaluation device; an evaluation report output span designating device which designates at least one evaluation report output spans about which an evaluation of the inputted performance operations are to be made within the length of the reference musical performance; and an evaluation report output control device which controls the evaluation report output device to output the evaluation report with respect to the at least one evaluation report output spans after the performance operations have finished. In the above-mentioned structure of a performance evaluating apparatus, the reference performance data providing device may include a music piece data memory which stores music piece data including the reference performance data; and a music piece data readout device which reads out the music piece data including the reference performance data successively from the music piece data memory to play back the reference performance. Alternatively, the reference performance data providing device may include a music piece data inputting device for inputting music piece data including the reference performance data so that the reference performance data can be inputted externally. In the latter case, the music piece data may be obtained via a communication network from a server machine in the network. The transmission may be a batch transmission or may be a real time transmission along with the playback of the performance.

According to the above-mentioned musical performance evaluating apparatus of the fifth aspect of the invention, the user can arbitrarily designate a particular span or spans in the length of a music piece about which span an evaluation report is to be outputted, by controlling the evaluation report output span designating device very easily. The designation can be entered at any arbitrary time in the midst of the performance operations or after the performance operations have finished. The evaluation report output span designating device may include an evaluation span designating data memory which stores data for designating evaluation report output spans, and an evaluation span designating data readout device which reads out the data for designating evaluation report output spans successively from the evaluation span designating data memory, so that the user is allowed to designate an intended number of evaluation spans arbitrarily beforehand. The evaluation report output span designating device may be designed to be capable of designating the evaluation report output spans according to control by the user in the midst of the successive readout of the music piece data, so that the user is allowed to designate the evaluation spans at any time in the midst of the performance. The evaluation report output span designating device may be designed to be capable of designating the evaluation report output spans according to control by the user after the successive readout of the music piece data has finished, so that the user can designate particular evaluation spans after the finish of the music piece data readout.

A sixth aspect of the present invention provides a storage medium for use in an apparatus for evaluating a musical performance, the apparatus being of a data processing type comprising a computer, the medium containing a program that is executable by the computer, the program comprising: a module for providing a reference performance data representing a musical performance as a reference for evaluation; a module for inputting manual performance operations by a user and outputting manual performance data representing the inputted performance operations to be evaluated; a module for comparing the input performance data with the reference performance data; a module for outputting an evaluation report based on the comparison by the comparing module; a module for designating at least one evaluation report output spans about which an evaluation of the inputted performance operations are to be made within the length of the reference musical performance; and a module for controlling the function of the outputting module to output the evaluation report with respect to the at least one evaluation report output spans after the performance operations have finished.

As will be apparent from the above description, the computer programs are useful for realizing a musical performance evaluating apparatus within the spirit of the present invention by installing such a program in a data processing apparatus or in an electronic musical instrument incorporating a computer so that an embodiment of the above-described fifth aspect of the invention can be easily configured.

A seventh aspect of the present invention provides a client/server system for evaluating a musical performance. A server machine comprises: a connecting device for connecting the server apparatus to a communication network to be available for an access from a client apparatus; a music piece data inputting device for inputting a music piece data including reference performance data representing a musical performance as a reference for evaluation; a manual performance data receiving device which receives, via the connecting device, a manual performance data representing inputted performance operations at the client apparatus; an evaluation device which compares the manual performance data with the reference performance data; an evaluation report output device which outputs an evaluation report based on the comparison by the evaluation device; an evaluation report output span designating device which designates at least one evaluation report output spans about which an evaluation of the inputted performance operations are to be made within the length of the reference musical performance; an evaluation report output control device which controls the evaluation report output device to output the evaluation report with respect to the at least one evaluation report output spans after the performance operations have finished; and an evaluation report transmitting device which transmits the outputted evaluation report to the communication network via the connecting device. A client machine comprises: a connecting device for connecting the client apparatus to a communication network to access a server apparatus; a reference performance data receiving device for receiving via the connecting device a music piece data including a reference performance data representing a musical performance as a reference for evaluation, a manual performance input device for inputting manual performance operations by a user and outputting manual performance data representing the inputted performance operations to be evaluated; a manual performance data outputting device which outputs the manual performance data to the communication network via the connecting device; an evaluation report output span designating device which designates at least one evaluation report output spans about which an evaluation of the inputted performance operations are to be made within the length of the reference musical performance, and outputs information about the at least one designated spans to the communication network via the connecting device such that the server apparatus outputs an evaluation report with respect to the manual performance data against the reference performance data; and an evaluation report receiving device which receives the evaluation report via the connecting device after the performance operations have finished.

According to the above-mentioned client/server system for evaluating a musical performance of the seventh aspect of the invention, the user inputs a practice performance, i.e. manual performance operations at the client machine and the server machine evaluates the user's performance and notifies to the client machine. The user may input a designation with respect to evaluation spans by the end of his/her performance operations. As the server can be a large scale machine and therefore can process a high level of evaluation (precise, high-speed, detailed, versatile, etc.), the client machine can be free from heavy-load processing. Where the server stores music piece data of reference performances and delivers a requested performance data to the client, the client machine does not have to prepare a big database of music piece data. Alternatively, however, the reference performance database may be prepared in the client machine, so that the user can easily and quickly select any desired music piece for practice at the user's end.

A eighth aspect of the present invention provides a storage medium for use a client machine for evaluating a musical performance, the machine being of a data processing type comprising a computer and having a connecting device to connect the machine to a communication network, the medium containing a program that is executable by the computer, the program comprising: a module for connecting the client machine to a communication network to access a server machine; a module for receiving via the connecting device a music piece data including a reference performance data representing a musical performance as a reference for evaluation; a module for inputting manual performance operations by a user and outputting manual performance data representing the inputted performance operations to be evaluated; a module for outputting the manual performance data to the communication network via the connecting device; a module for designating at least one evaluation report output spans about which an evaluation of the inputted performance operations are to be made within the length of the reference musical performance, and for outputting information about the at least one designated spans to the communication network via the connecting device such that the server machine outputs an evaluation report with respect to the manual performance data against the reference performance data; and a module for receiving the evaluation report from the server machine via the connecting device after the performance operations have finished. With this program, the client machine will work as a practice station for users, having evaluation faculty with respect to any particular performance spans of a music piece and being connected to the server machine via a communication network.

In all of the above-mentioned aspects of the present invention, an apparatus at the user's side preferably contain a playback device for playing back the music piece for practice and more preferably musical tone generating device for emitting audible sounds of the reference performance (of the music piece for practice), so that the user can play the music in tempo with the progression of the reference performance, inputting manual performance operations (manipulations). The tone generating device may be selectively made operative according to the necessity. The above-mentioned programs may preferably contain a module for processing musical tone signals in connection with the performance data.

As will be understood from the above description about a musical performance evaluating apparatus, a client/server system and a storage medium containing a computer program according to the present invention, a sequence of steps each performing the operational function of each of the structural element devices of the musical performance evaluating apparatus or of the structural modules of the computer program will constitute an inventive method for evaluating a musical performance according to the spirit of the present invention.

Further as will be apparent from the description herein later, some of the structural element devices of the present invention are configured by computer sub-systems performing the assigned functions according to the associated programs. They may of course be hardware structured discrete devices performing the same functions.

The present invention may take form in various components and arrangement of components including hardware and software, and in various steps and arrangement of steps. The drawings are only for purposes of illustrating preferred embodiments and processes, and are not to be construed as limiting the invention.

BRIEF DESCRIPTION OF THE DRAWINGS

For a better understanding of the present invention, and to show how the same may be practiced and will work, reference will now be made, by way of example, to the accompanying drawings, in which:

FIGS. 4a, 4b and 4c are flow charts describing operations with the first embodiment of the musical performance evaluating apparatus according to the present invention;

FIGS. 5a, 5b and 5c are flow charts describing further operations with the first embodiment of the musical performance evaluating apparatus according to the present invention;

FIGS. 8a, 8b and 8c are flow charts describing operations with the second embodiment of the musical performance evaluating apparatus according to the present invention;

FIG. 10 is a file format chart of an evaluation report output span designating data file employed in the third embodiment of the musical performance evaluating apparatus according to the present invention;

FIGS. 14a and 14b are flow charts describing an example of operations with the fifth embodiment of the musical performance evaluating apparatus according to the present invention.

DESCRIPTION OF THE PREFERRED EMBODIMENTS

Figure 1:
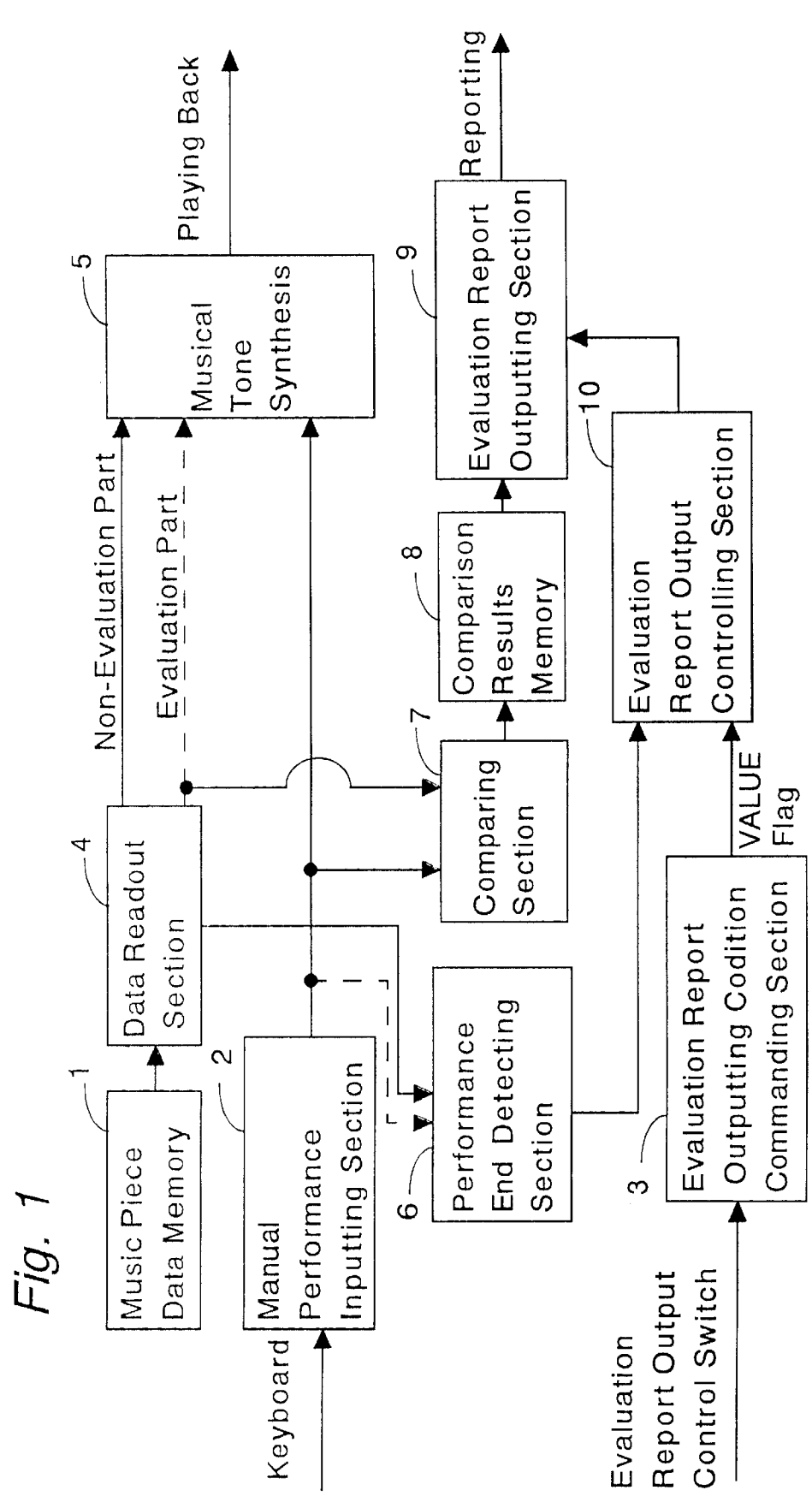
FIG. 1 is a block diagram showing the functional structure of a first embodiment of a musical performance evaluating apparatus according to the present invention.
Figure 2:
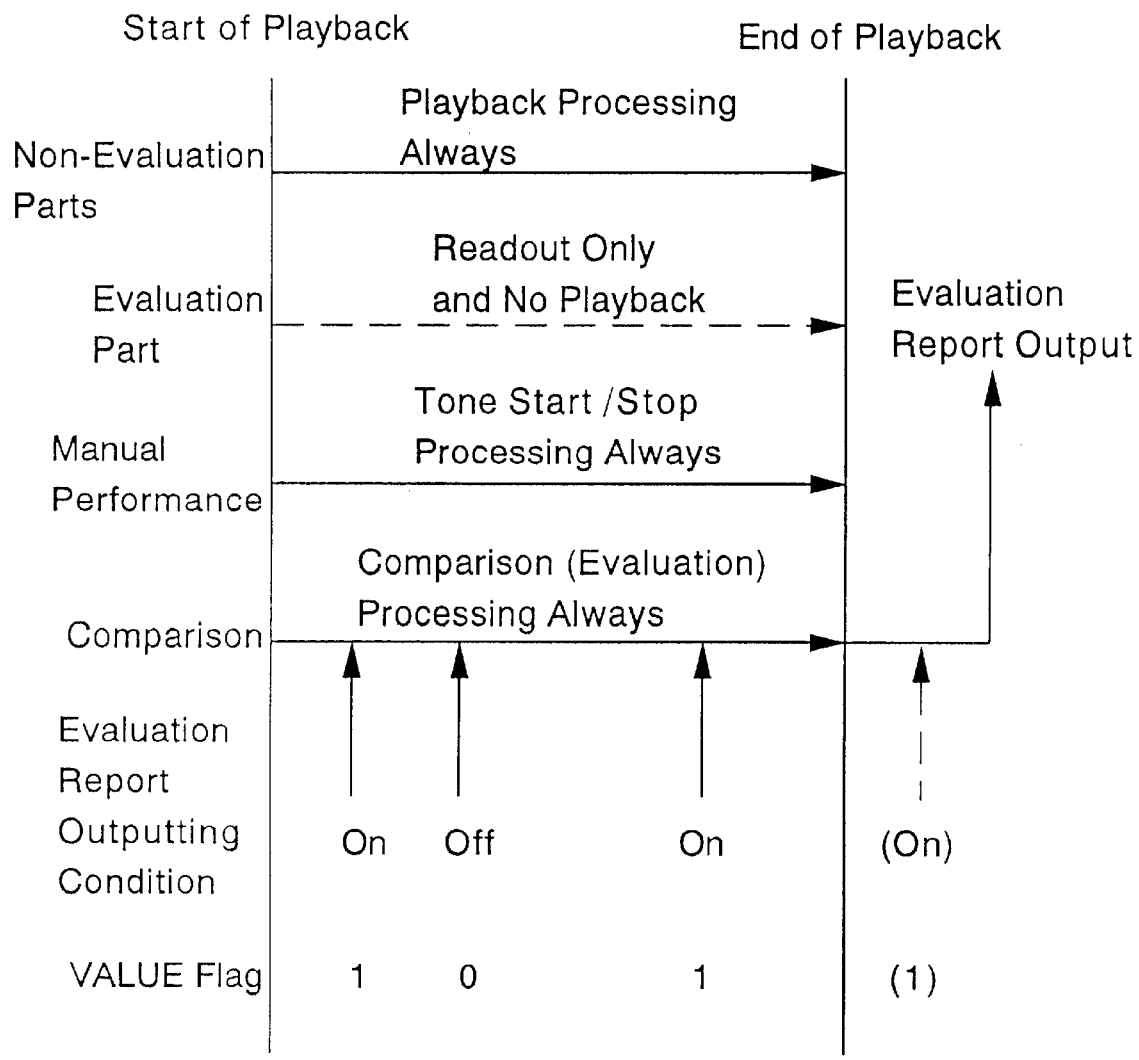
FIG. 2 is a sequence chart of reading out musical piece data, illustrating output conditions of evaluation report in the first embodiment of the present invention as shown in FIG. 1.

FIG. 1 shows a block diagram describing the functional structure of a first embodiment of a musical performance evaluating apparatus according to the present invention, and FIG. 2 shows a sequence chart of reading out musical piece data illustrating output conditions of evaluation report in the first embodiment shown in FIG. 1. In FIG. 2, the abscissa represents readout positions (locations) of the musical piece data.

Referring to FIG. 1, a music piece data memory 1 stores musical performance data of music pieces. The data format for the musical performance data may be of any type such as a "relative time+event" type which represents the time point of an event by a time lapse from the preceding event; an "absolute time+event" type which represents the time point of an event by an absolute time position from the top of the music piece or the top of each measure, a "note pitch (rest)+duration" type which represents the progression of music by aligning notes, each defined by the pitch and the duration, and rests, each defined by the duration (no pitch), and a "direct memory mapping" type in which memory regions are secured (allotted) for all the available time points under the minimum resolution of time progression for the music and each performance event is written at a memory region which is allotted to the time point for such each event. A manual performance inputting section 2 generates inputted performance data responsive to the user's input operations on a keyboard. An evaluation report outputting condition commanding section 3 holds data indicative of whether to output an evaluation report on the user's performance operations, according to the actuation of an evaluation report output control switch by the user.

A data readout section 4 reads out one or multiple performance parts of the music piece from the music piece data memory 1. A musical tone synthesizing section 5 synthesizes and generates musical tone signals in accordance with the respective inputs from the respective performance parts, and outputs mixed tone signals of these performance parts. A performance end detecting section 6 detects whether the music piece data stored in the music piece data memory 1 have been read out up to the end thereof or the readout process has been terminated by the user's operation to stop reading out. Alternatively, the performance end detecting section 6 may detect, through a connection as shown by a broken line in FIG. 1, a time point at which the input performance data from the manual performance inputting section 2 has not been outputted for more than a predetermined period of time. In this instance, the readout operation of the music piece data may be terminated simultaneously. A comparing section 7 continuously compares, during performance, the performance data of a part for evaluation (evaluation part) read out from the music piece data memory 1 and the performance data outputted from the manual performance inputting section 2. A comparison results memory 8 stores the results of the comparison at the comparing section 7.

Tone parameters to be compared include tone pitches at a key-on (i.e. note-on) event at the same time position (location) of the music piece data and of the inputted manual performance. Further included therein, for more precise comparison, key-off (note-off) time points or note durations, deviation (plus or minus time delay) of key-on time points, key depression intensities (velocities), etc. For evaluating chord performances, key manipulations to designate chords are also compared. The time positions (locations) of the music piece data are expressed herein in terms of values indicating measures, beats and "clock counts" defined by a predetermined submultiple (e.g. 1/24) of one beat of the quarter note, or in terms of time. An example will be described hereinbelow in connection with a case in which the evaluation is made with respect to the comparison of only the note pitches of the same key-on (note-on) event at the same musical time position in the same music piece data. Where there is a key-on (note-on) event in the evaluation part data outputted from the music piece data memory 1 and there is a key-on (note-on) signal simultaneously outputted from the manual performance inputting section 2 at the same time position of the music piece, if the note pitches of the both are identical, then the comparison output is made "1" (meaning concordant). On the contrary, where there is a key-on (note-on) event in the evaluation part data outputted from the music piece data memory 1 and there is a key-on (note-on) signal simultaneously outputted from the manual performance inputting section 2 at the same time position of the music piece, if the note pitches of the both are not identical, then the comparison output is made "0" (meaning discordant).

In the case of a musical performance in which there is a little probability that key-on events in the evaluation part of the read-out music piece data from the data readout section 4 and key-on events in the performance data from the manual performance inputting section 2 occur precisely concurrently, comparison may better be conducted with the minimum resolution of time points for the music piece data being made less fine (fairly coarser). Alternatively, the performance data of the evaluation part from the music piece data memory 1 may be read out in advance so that a predetermined timing allowance should be provided for each key-on time point by providing, for example, a predetermined period before and after each key-on time point, or a half of the note duration before and after each key-on time point of the note, and the comparison output will be made "1" (concordant) when a key-on data piece of the same note pitch as the corresponding one from the music piece data memory comes out from the manual performance inputting section 2 within such a timing allowance.

An evaluation report outputting section 9 reads out the comparison results from the comparison results memory 8 and calculates performance evaluation scores instantaneously in real time or later after the performance is over. An evaluation report output controlling section 10 controls whether to output an evaluation report, and is so operative also in the case where the evaluation report outputting section 9 calculates the performance evaluation scores in real time.

The music piece data memory 1 stores performance data of multiple parts such as a melody part, an automatic accompaniment part and a rhythm part for each of multiple music pieces. The data readout section 4 selects performance data of a certain single music piece according to the user's designation by means of selection means (not shown), and selectively reads out data of a particular performance part (e.g. a melody part) of which the manual performance inputted by the user is to be evaluated as an evaluation part and other performance parts as non-evaluation parts. The performance data of the non-evaluation parts are fed to the musical tone synthesis section 5, while the performance data of the evaluation part are fed to the comparison section 7. The user inputs the performance of the evaluation part by means of the keyboard, and the manual performance inputting section 2 outputs the performance data of the inputted performance operations through to the musical tone synthesis section 5 accordingly. The performance data of the evaluation part read out from the music piece data memory 1 may preferably be not fed to the musical tone synthesis section 5 so as not to play back the musical tones, but may alternatively be fed to the musical tone synthesis section 5 as shown by a broken line in FIG. 1. The user can play on the keyboard the practice music to be evaluated, listening to and in tempo with the reference performance played back as audible musical tones. Of course helpful would be a music score sheet or book describing the practice music piece so that the user can trace the music along with the music progression. Alternatively, or additionally, the read-out music piece data may be processed by an image processing circuit of the existing technology in the art to exhibit a music score of the music piece to be displayed on a screen (e.g. 18 of FIG. 3 as will be explained later) together with a moving cursor progressing along with the music progression. The user can follow the moving cursor to input the practice performance operations to be evaluated.

The user designates whether an evaluation report is to be outputted or not, by means of the evaluation report output control switch. The evaluation report outputting condition commanding section 3 indicates either the report outputting condition or the report suppressing condition by means of a value flag. On the condition that the output of the evaluation results is commanded, the evaluation report output controlling section 10 orders the evaluation report outputting section 9 to report the calculated evaluation scores about the entire music piece based on the evaluation results (judgments) stored in the comparison results memory 8 after the readout of the performance data stored in the music piece data memory 1 is completed. There are two styles of inputting the evaluation report output condition commands: the one is the style in which the command input is retained until the end of the playback once a command is given to output evaluation reports by means of the evaluation report output control switch; and the other is the style in which the both commands to output the report and to suppress the report can be arbitrarily changed as many times as desired until after the performance playback has come to an end.

Described herein below is an example which belongs to the second style above. The evaluation report output control switch is a push-button switch with a toggle operation (i.e. a push/push switch). Every time the push-button is pressed, the evaluation report outputting condition and the evaluation report suppressing condition are alternately commanded from one condition to another. Thus, the user can arbitrarily change commands between outputting an evaluation report and not outputting an evaluation report during the playback. The command for evaluation report output may be given after the playback is over. FIG. 2 depicts an example in which the evaluation report output control switch is operated several times to render "on", "off" and "on" along the progression of the music piece between the start and the end of the playback, according to the user's mind change. The evaluation report outputting condition commanding section 3 holds the latest condition of the actuated evaluation report output control switch. In the case where the evaluation report outputting condition is "on", namely, the value flag which is the output from the evaluation report outputting condition commanding section 3 takes the value "1" at the end of the playback, the evaluation report output controlling section 10 controls the evaluation report outputting section 9 to report the evaluation results from the start of playback of the music piece until the end of playback of the music piece. On the contrary, in the case where the evaluation report outputting condition is "off", namely, the value flag which is the output from the evaluation report outputting condition commanding section 3 takes the value "0" at the end of the playback, the evaluation report output controlling section 10 controls the evaluation report outputting section 9 not to report the evaluation results. The end of playback herein not necessarily means the final end of a music piece (i.e. end data position), but also may mean any intermediate position at which the user stops the music piece playback or the user stops the performance operation.

Figure 3:
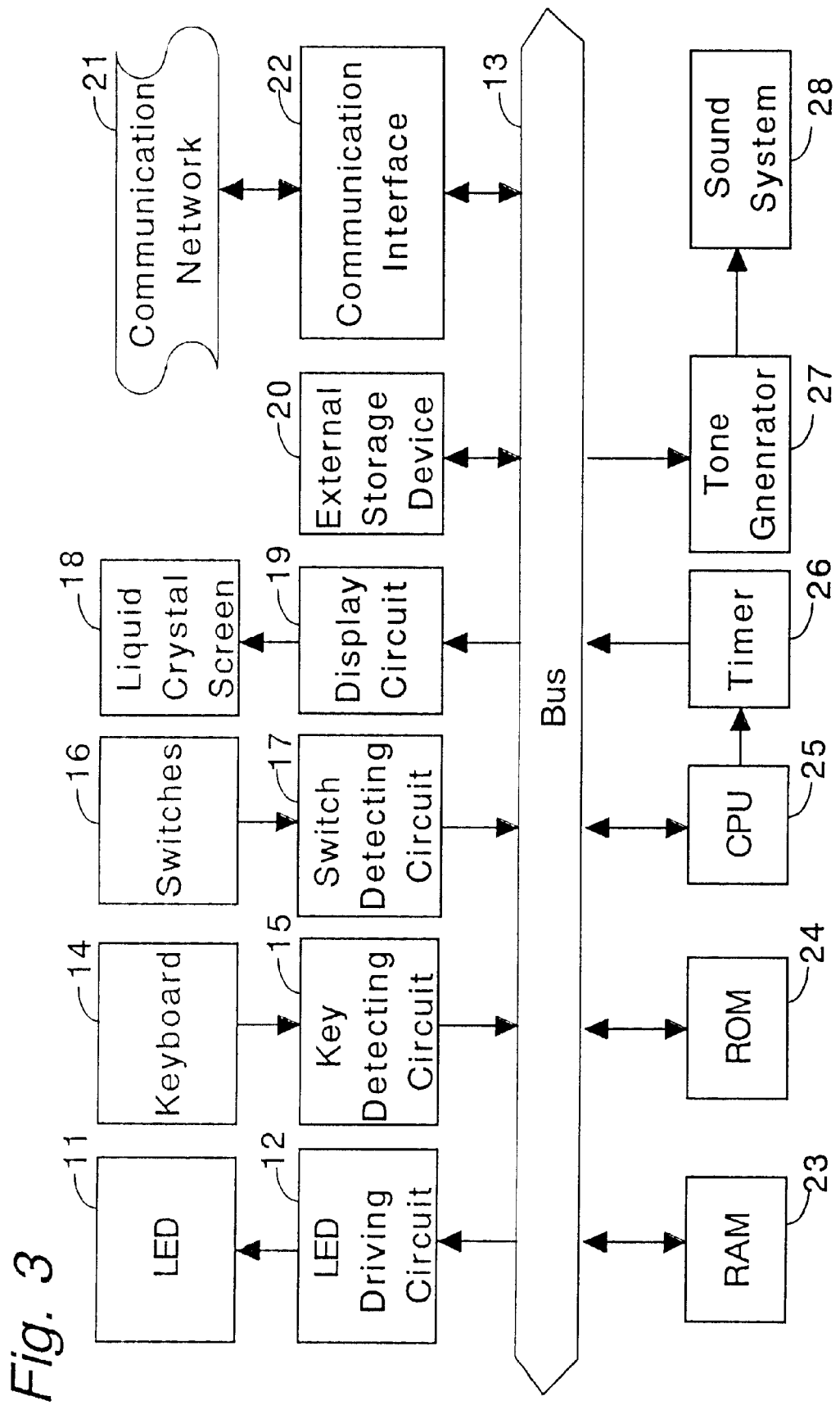
FIG. 3 is a block diagram illustrating an example of a hardware structure common to the first through a fourth embodiment of the musical performance evaluating apparatus according to the present invention.

Normally, the operations of the evaluation report output control switch have been finished before the end of playback. But even after the playback has come to an end with the evaluation report outputting condition being commanded to be "off", the evaluation results can be reported by actuating the evaluation report output control switch to set the evaluation report outputting condition to be "on" as shown by a short broken line arrow with a parenthesized description "(On)" near the right hand end of FIG. 2, as long as the stored contents in the comparison results memory 8 have not yet been deleted. The evaluation report outputting section 9 may start calculation of obtaining the evaluation results with respect to the entire music piece based on the comparison results immediately before outputting the evaluation results, or alternatively may conduct calculation instantaneously during the performance playback based on the comparison results, irrespective of the commanded condition of the evaluation report output. FIG. 3 illustrates a block diagram of an example of a hardware structure of the first embodiment of the musical performance evaluating apparatus according to the present invention. As will be apparent in the description hereinbelow, this hardware structure is common to other embodiments. The performance evaluation apparatus of this embodiment may preferably be incorporated in an electronic musical instrument.

In FIG. 3, light emitting diodes (LEDs) 11 are to indicate requests for input manipulations, conditions under manipulations, etc., an LED driving circuit 12 is to drive the LEDs, a bus 13 interconnects structural hardware elements of the apparatus, a keyboard 14 is for inputting user's manipulations for a music performance, a key switch detecting circuit 15 detects key depressions and releases on the keyboard 14, switches 16 includes an evaluation report output control switch, switches for commanding write-in, playback and stop of the music piece data, switches for setting tone parameters, and so on, and may be of various types such as a push button type, up-down key type, rotary type, ten-key type, and so forth according to manipulation manners. A switch detecting circuit 17 detects actuations of the switches 16. A liquid crystal screen 18 is to visually display a setting menu, performance evaluations, etc. A display circuit 19 is to drive the liquid crystal screen 18. An external storage device 20 may be of any types including a flexible disk drive (FDD), a hard disk drive (HDD), a magneto-optical disk (MO) drive, CD-ROM drive, DVD drive, etc.

The bus 13 of the apparatus is connected to a communication network 21 such as a LAN (local Area Network), a telephone network and Internet via a communication interface 22 so that the apparatus can access a server computer (not shown) available in the communication network 21. A random access memory (RAM) 23 is provided to serve as working areas, a key depression/release buffer, a buffer area for the VALUE flag, a buffer area for temporarily store the comparison results for the performance evaluation, etc. A read-only memory (ROM) 24 stores tone waveform data, preset data, music piece data for automatic accompaniment play and demonstration play, etc. A central processing unit (CPU) 25 controls an administrates the operations and processings of the entire apparatus. A timer 26 controls interrupt timing for the programs, and also serves to count time for any other jobs. A tone generator 27 may be of a wave form memory type or else and is to generate (synthesize) musical tone signals according to tone parameters inputted from the bus 13. The tone generator 27 may include a digital signal processor (DSP) to impart tone effects such as reverberation and chorus to the generated tone signals. A sound system 28 includes an a amplifier and loudspeakers to convert tone signals to audible sounds.

The CPU 25 performs processing for the performance data inputted via the keyboard 14 and the control data inputted via the switches 16 using the RAM 23 and the ROM 24 to execute the program for performance evaluation, and controls the tone generator 27 based on the processed performance data. Where the external storage device 20 is of a record-and-playback type, the performance data can be stored and played back in the form of music piece data. At least part of the function of the tone generator 27 may be realized by software executed by the CPU 25 with a program therefor.

The external storage device 20 may store tone color data sets and music piece data sets and is available for storing data which is not included in the ROM 24. Where the external storage device 20 is an HDD, the HDD may store control programs and various associated data which are not included in the ROM 24 so that the programs and data can be transferred to the RAM 23 from the HDD for the CPU 25 to conduct processing just like the case where such programs and data are stored in the ROM 24. This fashion of operation is advantageous in that an addition and an up-grading of the control program are easily conducted. In the case of a CD-ROM drive, the control programs and various data in the CD-ROM will be read out therefrom and will be stored in the HDD. In the case that the ROM 24 and the HDD do not store the control program and the various associated data, such program and data may be downloaded from an external server computer located in the communication network 21. The electronic musical instrument which is a client machine in the network system transmit a download requesting-command for a control program and various necessary data to the server computer via the communication interface 22 and the communication network 21. The server computer receives such a command, and delivers the requested program and data to the electronic musical instrument via the communication network 21, and the electronic musical instrument receives the delivered program and data through the communication interface 22 to store the same in the HDD, thus completing the downloading operation.

Although omitted in the drawing, the electronic musical instrument may include MDI input/output terminals, an IEEE1394 (MLAN) terminal or an RS232C terminal to be capable of transferring MDI data to and from MDI apparatuses such as a MIDI keyboard and a sequencer, an external tone producing apparatus having a musical tone data playback function, an external input/output apparatus such as a personal computer, and so forth. While the above-described electronic musical instrument is of a keyboard type, but may be of a wind instrument type, a percussion instrument type, or any other types. The manner of inputting music performances will vary according to the instrument types. Tone colors may be freely assigned to produce musical tones in any desired tone colors irrespective of the types of the instrument. For example, an electronic musical instrument of a wind instrument type can produce musical tones in a violin voice. The performance evaluation apparatus of the present invention can be realized not only on an exclusively designed electronic musical instrument including the tone generator 27 and an automatic performance function as shown in FIG. 3, but also with a personal computer connected to an electronic musical instrument through a serial interface such as an RS232C and executing a performance evaluation processing program. The inventive apparatus may also be realized with a personal computer installed with a CODEC driver and executing a performance evaluation processing program and a tone signal processing program having an automatic performance function under the CPU and operating system (OS). The performance evaluation processing program and the tone signal processing program may be supplied via the communication network or by means of a storage medium such as a CD-ROM, and may be installed into a hard magnetic disk in a personal computer to be executed by the personal computer as is the case with the electronic musical instrument shown in FIG. 3.

FIGS. 4a, 4b and 4c depict flow charts describing operations with the first embodiment of the musical performance evaluating apparatus according to the present invention, in which FIG. 4a covers the main processing of a program containing a performance evaluation function, FIG. 4b covers the playback processing, and FIG. 4c covers the key actuation interrupt processing. FIGS. 5a, 5b and 5c depict flow charts describing further operations with the first embodiment of the musical performance evaluating apparatus according to the present invention, in which FIG. 5a covers the timing interrupt processing during a playback processing, FIG. 5b covers the processing of switching the evaluation report outputting conditions during a playback processing, and FIG. 5c covers the evaluation report outputting processing.

In the main processing of FIG. 4a, a step S31 initializes the setting parameters and the buffers of the apparatus. A step S32 selects the music piece data of a music piece to be an object of playback and of evaluation about the user's performance. A step S33 selects, from among the selected music piece data, a performance part of which the user's performance is to be evaluated. A step S34 judges where there is command to start the playback of the music piece data, and directs the processing to a step S35 in case the judgment is affirmative (yes), while directing to a step S36 in case the judgment is negative (no). The step S35 starts the play back processing program in which is described in the flow chart of FIG. 4b. Once the playback processing program is started, the key actuation interrupt processing of FIG. 4c takes place in response to occurrence of a key depression/release event, and the timing interrupt processing of FIG. 5a takes place at occurrences of the predetermined timing clocks. After the playback processing of FIG. 4b is over, the processing returns to the main processing of FIG. 4a and moves forward to a step S36 to execute various setting processing in connection with the tempo, transposition, and other necessary processings before going back to the step S32 for selection of the next music piece.

In the playback processing of FIG. 4b, a step S41 initializes the various settings. For example, the data read out pointer is set at the top position of the selected music piece data, a mute setting is placed on the selected evaluation part so that musical tones should not be generated for the evaluation part, and a value flag which will be explained herein later is set to be "0" (not to output the evaluation report). A step S42 judges whether there is an actuation of the evaluation report output control switch (a toggle switch), and if the judgment is affirmative (yes), the process move forward to a step S43, and if the judgment is negative (no), the process skips to a step S44. The step S43 starts the processing of switching the evaluation report outputting conditions shown in FIG. 5b, and returns the processing to the flow of FIG. 4b after the processing of FIG. 5b is finished to direct the flow to a step S44. A step S71 of FIG. 5b inverts the value of the VALUE flag. Namely, the value "1" is changed to "0", while the value "0" is changed to "1". Now back to the flow of FIG. 4b, the step S44 judges whether the playback is over. If the judgment is affirmative (yes), the process moves forward to a step S45 to start the evaluation report outputting processing, while if the judgment is negative (no), the process goes back to the step S42. The judgment about the finish of the playback is ruled by the fact that the end data is read out from the selected music piece data to terminate the playback or by the fact that the user has practiced a playback stopping operation to terminate the playback. The data readout may also be stopped if the user has not entered any performance manipulations (inputs) for more than a predetermined period of time.

In the step S45 of FIG. 4b, the evaluation report outputting processing of FIG. 5c takes place, and upon finish of this processing, the process returns back to the main routine processing flow to go forward to the step S36. In the process flow of FIG. 5c, a step S75 judges whether the VALUE flag is "1" or not, and if the judgment is affirmative (yes), the process moves forward to a step S76, while if the judgment is negative (no), the process returns to the playback processing of FIG. 4b. The step S76 outputs an evaluation report with respect to the user's performance operations based on the count value stored in the comparison results memory. The evaluation report may be in terms of a score representing the points calculated from the points obtained on performance accuracy with or without visible or audible comments in words according to the points earned. A typical example of score calculation is:

points=(counts of concordance)/(counts of concordance+counts of discordance)×100

The points may be further weighted by the average of deviations of timing or deviations of velocity, wherein the greater the deviation is, the lower the score is, to evaluate more precisely.

The key actuation interrupt processing of FIG. 4c is executed every time the key actuation interrupt event occurs on the condition that the playback processing is rung. A step S51 initiates tone start processing with the tone generator when a key depression event occurs, and initiates tone stop processing when a key release event occurs. A step S52 renews the contents of the key depression/release buffer to thereafter finish the key actuation interrupt processing. The key depression/release buffer stores the current key actuation condition (i.e. being depressed or released) in association with the user's manual performance on the keyboard. In other words, upon a new depression of a key on the keyboard, key depression data including the note pitch, the velocity (i.e. intensity), key depression start time point, etc. of the depressed key, and upon a new release of a key on the keyboard, the key depression data of the released key is deleted from the key depression/release buffer. The contents of the key depression/release buffer is used for comparing the performance data in the timing interrupt processing described herein later.

The timing interrupt processing of FIG. 5a is executed every time the predetermined timing clock pulse comes on the condition that the playback processing is running. The timing clock pulses are typically generated, for example, at a rate of the fundamental clock of the system, which defines the minimum unit of time interval for processing the data in the system. A step S61 conducts processing of playing back the non-evaluation part. This processing is to judge whether there is any performance event such as a key-on, a key-off and a program change in one or more of the non-evaluation parts to be processed at the current interrupt time point, and to process such performance event, if there is. For example, in response to a note-on event, the CPU controls the tone generator 27 to generate a tone signal having a note pitch as designated by the note-on event. A step S62 judges whether there is an event of processing on the evaluation part. If there is such an event, the process moves forward to a step S63, and if there is no such event, the process skips to finish this interrupt subroutine and to return to the playback routine. The event of processing on the evaluation part includes a key-on event and a key-off event to be evaluation references in the evaluation part read out from the music piece data memory 1 at the current interrupt time point. The step S63 compares the performances and store the comparison result on the current event. Namely, the step S63 judges the concordance or discordance of the note pitches, etc. between the key-on or key-off event in the evaluation part read out from the music piece data memory 1 at the current interrupt time point and one or more key-on or key-off event staying in the key depression/release buffer at the current interrupt time point, and counts up (increments) the count number in either the concordance counter or the discordance counter, and successively stores the count values in the comparison results memory 8. Comparison may be made with respect to the key-on events only. The velocity value of key depression and the deviation amounts of key-on time and/or key-off time may also be stored in the memory at each interrupt time point so that such information will be used for the evaluation results calculation and be reflected in the final evaluation report.

Figure 6:
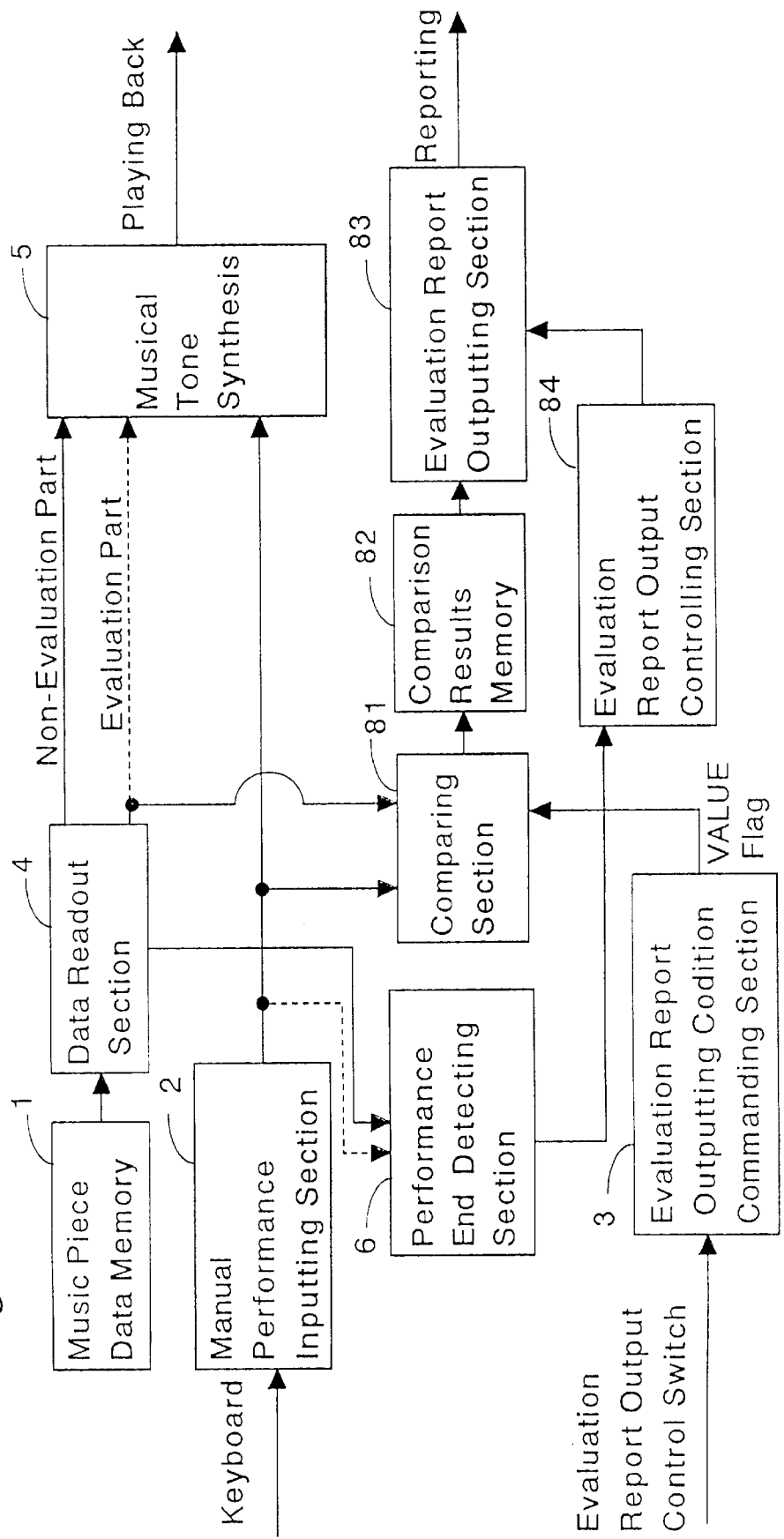
FIG. 6 is a block diagram showing the functional structure of a second embodiment of the musical performance evaluating apparatus according to the present invention.

FIG. 6 shows a block diagram illustrating the functional structure of a second embodiment of the musical performance evaluating apparatus according to the present invention. The elements which are the same as those in FIG. 1 are referenced by the same numeral, and descriptions thereof are omitted here for the sake of simplicity. The differences reside in that the VALUE flag from the evaluation report outputting condition commanding section 3 is supplied to a comparing section 81 in place of to an evaluation report output controlling section 84. A comparison results memory 82 stores the results from the comparing section 81, and an evaluation report outputting section 83 reports the comparison results under the control of the evaluation report output controlling section 84.

Figure 7:
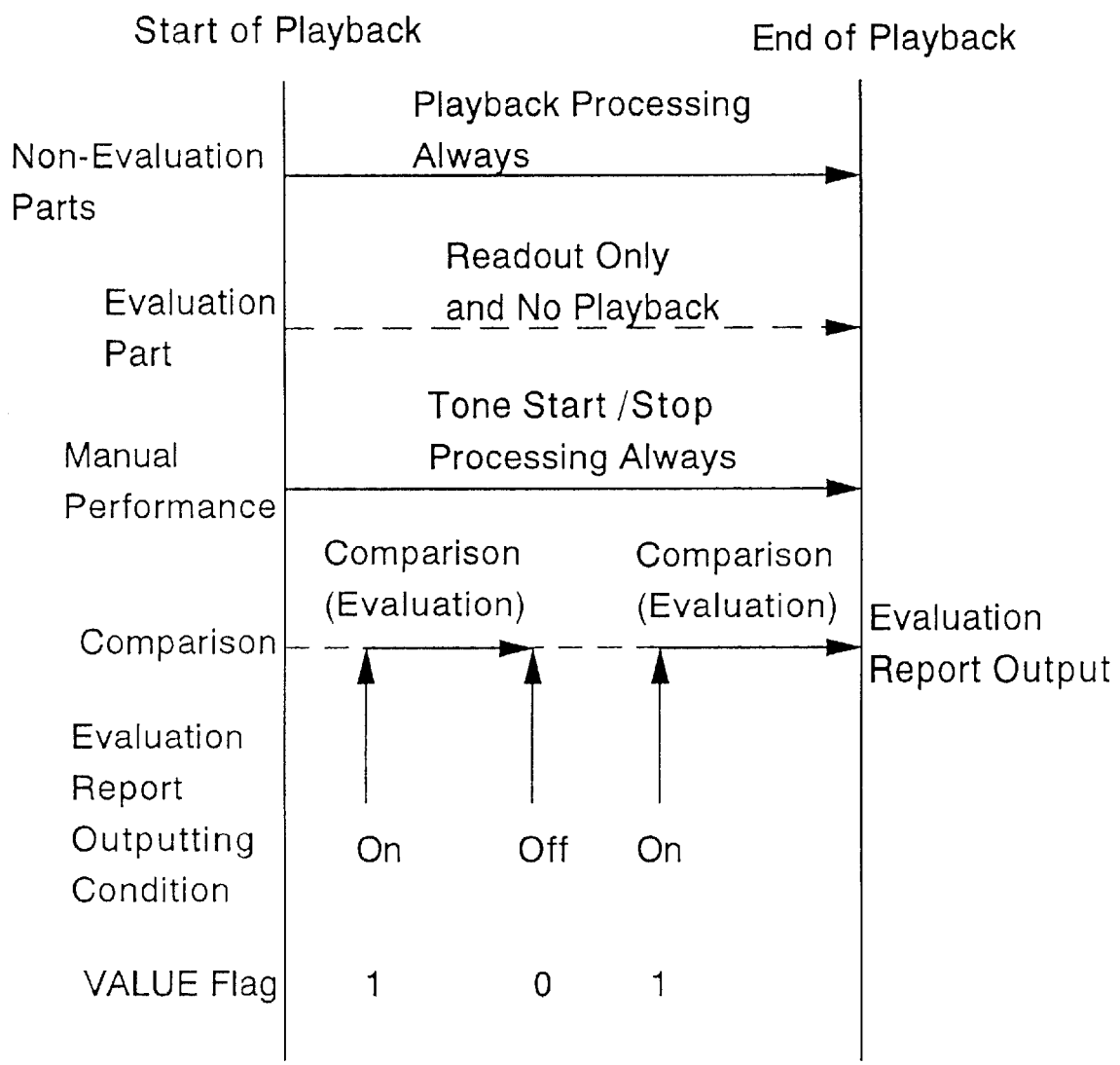
FIG. 7 is a sequence chart of reading out musical piece data, illustrating output conditions of evaluation report in the second embodiment of the present invention as shown in FIG. 6.

FIG. 7 shows a sequence chart of reading out musical piece data, illustrating output conditions of evaluation report in the second embodiment of the present invention. With this embodiment the user manipulates the evaluation report output control switch during the playback progression to designate performance spans in which evaluation reports are to be outputted, so that the evaluation reports are given only with respect to the designated spans and for each of the spans. As shown in FIG. 7, every time the user manipulates the evaluation report output condition switch during the playback operation, the on/off state of the evaluation report outputting conditions in the evaluation report outputting condition commanding section 3 is invented, and consequently the VALUE flag from the evaluation report outputting condition commanding section 3 flips to be "1", "0" and "1". The comparison section 81 receives the VALUE flag and compares the performance data of the evaluation part (in the music piece data) and the performance data of the manually inputted performance by the user for each evaluation span which starts at the moment the VALUE flag turns to "1" and ends at the moment the VALUE flag turns to "0", and stores the evaluation result for each evaluation span into the comparison results memory 82. The evaluation report outputting controlling section 84 controls the evaluation report outputting section 83 to output an evaluation report, visually or audibly, based on the respective evaluation results about the respective evaluation spans.

The manners of evaluation are similar to the case of the first embodiment. The calculations on evaluation may be initiated immediately before outputting an evaluation report based on the comparison results for the respective evaluation spans, or alternatively may be performed at the end of each evaluation span based on the comparison result of such each span during the playback, wherein the evaluation reports are stored in the buffer so that the final report is to be outputted after the performance is over Further alternatively, reports may be outputted successively for each of the evaluation spans in real time in the midst of performance. In the latter case, the comparison result of the evaluation span on which the calculation for evaluation has finished may be deleted from the comparison results memory 82 to save the memory capacity. Further alternatively, the comparing section 81 may conduct comparing operation continuously (instantaneously) and the comparison results memory 82 may store the comparison results of all the evaluation spans together with the respective positional information, wherein the comparison results will be taken out for each of the evaluation spans immediately before the evaluation report is to be outputted, and the evaluation score will be reported for each of the designated evaluation report outputting spans.

FIGS. 8a, 8b and 8c depict flaw charts describing operations with the second embodiment of the musical performance evaluating apparatus according to the present invention. The second embodiment includes the main processing, the playback processing and the key actuation interrupt processing as is the case of the first embodiment. The flow charts for these three partial processings are the same as FIGS. 4a, 4b and 4c, respectively, and are omitted here for the sake of simplicity. The flow charts of FIGS. 8a, 8b and 8c are of the timing interrupt processing, the processing of switching evaluation report outputting conditions, and the evaluation report outputting processing, respectively, and correspond to the flow charts of FIGS. 5a, 5b and 5c, respectively, with some slight alterations.

In the main processing of FIG. 8a, a step S91 conducts processing of playing back the non-evaluation part as the step S61 of FIG. 5a does. A step S92 judges whether there is an event of processing on the evaluation part, and if there is such an event, the process moves forward to a step S93, and if there is no such event, the process skips to finish this interrupt subroutine and to return to the playback routine, just like the case of the step S62 in FIG. 5a. A step S93 judges whether the VALUE flag is equal to "1", and if it is equal to "1", the process goes to a step S94, and if it is not equal to "1", the processing of this flow will be finished. The fact that the VALUE flag is "1" means that the user has commanded the output of an evaluation report. The step S94 compares the performances and stores the comparison result. The comparison results are successively stored in the respective buffer areas independently provided in the comparison results memory 82 with respect to the respective evaluation spans demarcated by the VALUE flags. Namely, the step S94 judges the concordance or discordance of the performance data of the current read-out event from the music piece data memory 1 and the performance data staying in the key depression/release buffer, and counts up (increments) the count number in either the concordance counter or the discordance counter, and successively stores the count values of the concordance counter and of the discordance counter into the comparison results buffers which are provided for the respective evaluation spans, as will be described in more detail herein later referring to FIG. 8b. As in the case of the first embodiment, the velocity value of key depression and the deviation amounts of key actuation time may also be stored in the comparison results buffers provided for the respective evaluation spans, so that such information will be used for the evaluation results calculation and be reflected in the final evaluation report.

When the processing of switching the evaluation report outputting conditions is initiated according to a manipulation of the evaluation report output control switch in the midst of the playback processing, the processing of switching the evaluation report outputting conditions shown by the flow chart of FIG. 8b is executed. Then, a step S101 inverts the value of the VALUE flag. A step S102 judges whether the value is equal to "1", and if the value ofthe VALUE flag is "1", the process is directed to a step S103, and if the value is not "1", the process is directed to a step S104. As the starting point ofthe evaluation span is determined by the time position at which the evaluation report outputting command is turned from "off" to "on" and the ending point of the evaluation span is determined by the time position at which the command is turned from "ton" to "off", the performance progression are successively divided into separate evaluation spans responsive to the evaluation report outputting commands. Accordingly, the comparison results memory 82 is provided with comparison result buffer areas for the respective evaluation spans, so that the comparison results on the manual performance at the respective corresponding evaluation spans are to be respectively stored in the corresponding buffer areas successively. In this connection, the step S103 creates a comparison buffer for each new evaluation span in the comparison results memory 82 before ending the processing flow of FIG. 8b. The step S104 is to close the comparison buffer for the current evaluation span before ending the processing flow of FIG. 8b. Once the calculation for the evaluation of the current evaluation span is completed, there is no longer a need of keeping these comparison buffer areas.

When the end of the playback is detected in the flow of the playback processing of FIG. 4b, the evaluation report outputting processing of FIG. 8c is initiated. Then, a step S111 conducts the calculation for the evaluation about each of the evaluation report output spans based on the value in the comparison buffer prepared for each of the evaluation spans, and reports the evaluation score about the user's performance in each of the evaluation reporting spans, before finishing the processing flow of FIG. 8c. The manners of calculating the evaluation scores and the manners of reporting the same may be the same as the case of the first embodiment, except that the scores are calculated and reported for a plurality of evaluation spans, respectively.

In the above description about the second embodiment, the user designates the evaluation report outputting spans using the evaluation report output control switch within the period from the start till the end of the playback. The manner of designating the evaluation report outputting spans may be otherwise, and such manners will be described hereinafter with reference to further embodiments.

Figure 9:
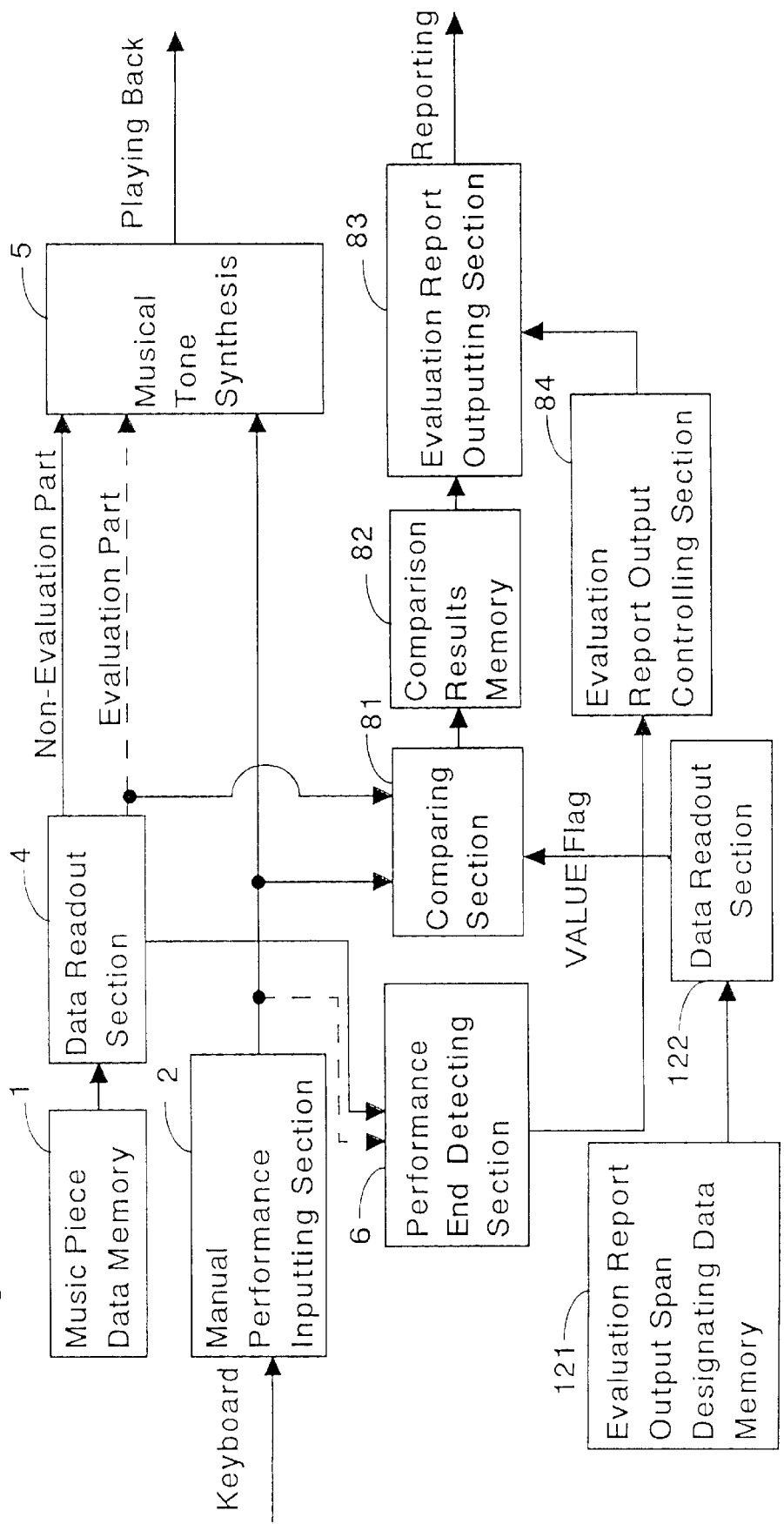
FIG. 9 is a block diagram showing the functional structure of a third embodiment of the musical performance evaluating apparatus according to the present invention.

FIG. 9 shows a block diagram illustrating the functional structure of the third embodiment of the musical performance evaluating apparatus according to the present invention. Like elements as in FIGS. 1 and 6 are labeled with like references to omit superfluous descriptions. An evaluation report output span designating data memory 121 and a data readout section 122 are provided to output the VALUE flag to be supplied to the comparing section 81. FIG. 10 shows a file format chart of an evaluation report output span designating data file employed in the third embodiment of the musical performance evaluating apparatus according to the present invention. In this embodiment the user arbitrarily determines particular spans about which the evaluation reports are to be outputted beforehand, i.e. before starting the playback, and prepares a data file for designating the evaluation report output spans and the data file is stored in the evaluation report output span designating data memory 121. The data readout section 122 reads out the data from the evaluation report output span designating data memory 121, while the data readout section 4 reads out the data from the music piece data memory 1.

The evaluation report output span designating data file includes pairs of time point and VALUE flag, each pair is aligned one after another in sequence in the order of times occurring in the performance progression. When the time point value of the performance data read out from the music piece data memory 1 and the time point value read out from the evaluation report output span designating data memory 121 coincides with each other (i.e. concordant occurrences), the value of the VALUE flag stored in a pair with the concordant time point in the data file is read out and supplied to the comparing section 81. The evaluation report output span designating data file includes VALUE flags of "1" at the time points where the evaluation report output spans begin and VALUE flag of "0" at the time points where the evaluation report output spans end. When the read-out VALUE flag is supplied to the comparing section 81, the processing similar to the case of the second embodiment takes place. When the performance end detection section 6 detects the end of the playback, the evaluation report output controlling section 84 controls the evaluation report outputting section 83 to report the evaluation scores about the respective evaluation spans.

Figure 11:
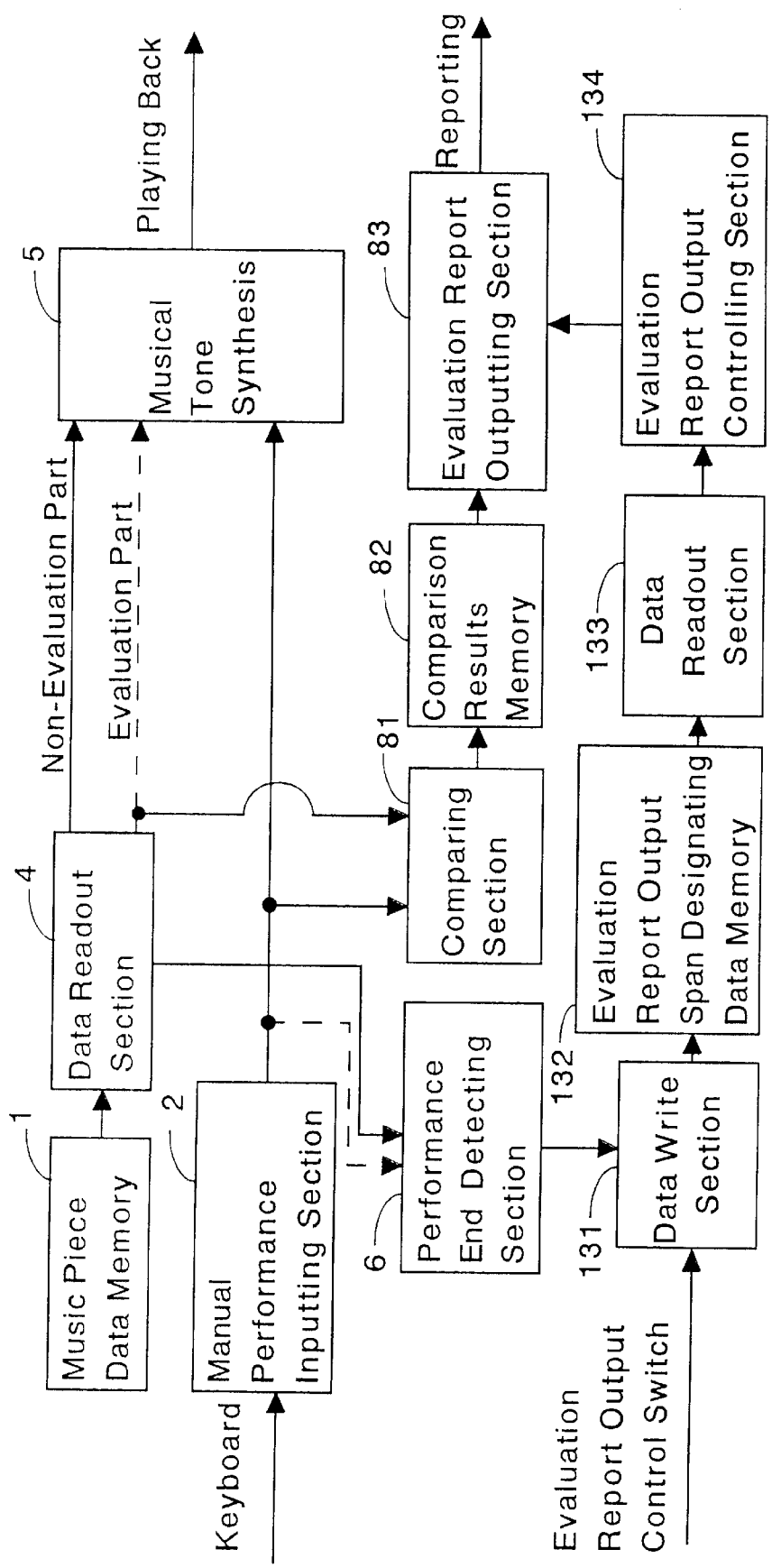
FIG. 11 is a block diagram showing the functional structure of a fourth embodiment of the musical performance evaluating apparatus according to the present invention.
Figure 12:
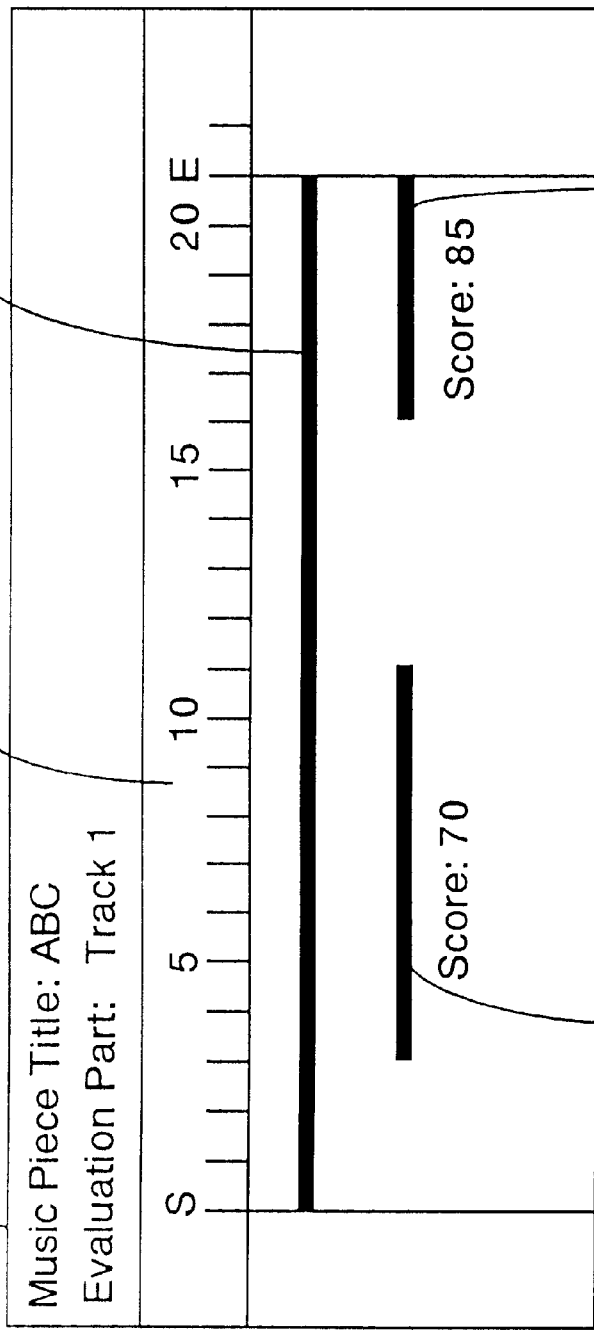
FIG. 12 is a schematic graphic chart illustrating a display screen with the fourth embodiment of the musical performance evaluating apparatus according to the present invention.

FIG. 11 shows a block diagram illustrating the functional structure of the fourth embodiment of the musical performance evaluating apparatus according to the present invention. Like elements as in FIGS. 1 and 6 are labeled with like references to omit superfluous descriptions. A modified part involves a data write section, an evaluation report output span designating data memory 132, a data readout section 133 and an evaluation report output controlling section 134. FIG. 12 is a schematic graphic chart illustrating a display screen with the fourth embodiment of the musical performance evaluating apparatus according to the present invention. A display screen 141 exhibits a master track scale 142 indicating time positions in the music progression, an indication bar 143 of the evaluation part, an indication bar 144 of the first evaluation report output span and an indication bar 145 of the second evaluation report output span. In this embodiment, the user arbitrarily designates, after the playback of the performance comes to an end, particular spans about which the evaluation reports are to be outputted by means of the evaluation report output control switch referring to the indication bar 143 of the evaluation part exhibited along the time position scale 142 on the display screen 141.

In FIG. 12, there are shown two span indication bars, the indication bar 144 of the first evaluation report output span and the indication bar 145 of the second evaluation report output span. These indication bars are written in the screen by setting the start position and the end position of each bar using the evaluation report output control switch such as an up-switch, a down-switch and a ten-key pad. In the case of a personal computer equipped with a mouse device, the bars can be located on the screen with the aid of the mouse pointer. After the performance is over, the data write section 131 detects the start position and the end position of each evaluation report output span in association with the user's write-in operation for the first span indication bar 144 and the second span indication bar 145, and writes the position data and the VALUE flags of these span indication bars into the evaluation report output span designating data memory 132. The data structure in the evaluation report output span designating data memory 132 may be of the same file format as that which is shown in FIG. 10.

After the evaluation report output span designating data have been written into the evaluation report output span designating data memory 132, the data readout section 133 reads out the evaluation report output span designating data, and supplies the same to the evaluation report output controlling section 134. The evaluation report output controlling section 134 controls the evaluation report outputting section 83 to selectively pick out the comparison result data about the designated evaluation report output span from among the comparison results data in the comparison results memory 82 according to the evaluation report output span designating data for each span, to calculate the evaluation value, i.e. score about the designated evaluation report output span, and to report the score using the display screen 141, or the like. The display screen 141 of FIG. 12 may also be used as the report output form for the second and the third embodiment.

A performance evaluation apparatus for actual use may be practiced with any of the above-described embodiments, alone or together. While the second through fourth embodiments conduct the comparison of the performance and the calculation of the evaluation scores about the designated evaluation report output spans only, the comparison and the calculation may also be conducted for the entire span from the very beginning till the end of the playback, and the evaluation score for the entire music piece and the evaluation scores for the respective designated spans may be reported together upon finish ofthe playback. In this latter situation, the comparison results memory 82 is to store both the comparison result about the entire music piece and the comparison results about the respective designated evaluation spans.

Although the evaluation report output cannot be canceled in the above-mentioned second through fourth embodiments, once the evaluation report output spans are set, there may be provided in these embodiments a further evaluation output control switch and the associated sections 3 and 10 like those which are shown in FIG. 1, so that the setting manipulation for whether to output the evaluation report can be conducted separately from the setting manipulation for the span designation, and then the control of whether to output the report or not can be separately exercised as to the entire span evaluation. The separate manipulations may be given not only by separate switches, but also by different operation manners like single clicking and double clicking, wherein the setting command may be inputted by single clicking and the report output control command may be inputted by double clicking.

In the above described first through fourth embodiments, the command for an evaluation report output can be ordered only after the playback is started. However, the functional structure may be so designed that the command for outputting an evaluation report can be ordered before the playback is started, by manipulating the evaluation report output designation switch to turn the VALUE flag on. For this purpose, the main processing flow is to be slightly modified so that the VALUE flag will not be reset at the time of the initialization and that the switch manipulation event will be judged before the start of the playback. Further alternatively, the performance evaluation apparatus may be of a complex design including multiple embodiments from among the above such that the third embodiment type of processing takes place when the evaluation report output span designating data are inputted in the evaluation report output span designating data memory before the start of the playback, the first or second (which one may be selected by a separate switch) embodiment type processing takes place when the evaluation report output span designating data is not stored in the memory and there comes a manipulation event of the evaluation report output control switch in the midst of the playback, and the fourth embodiment type processing takes place when there comes a manipulation event of the evaluation report output control switch only after the end of the playback.

Figure 13:
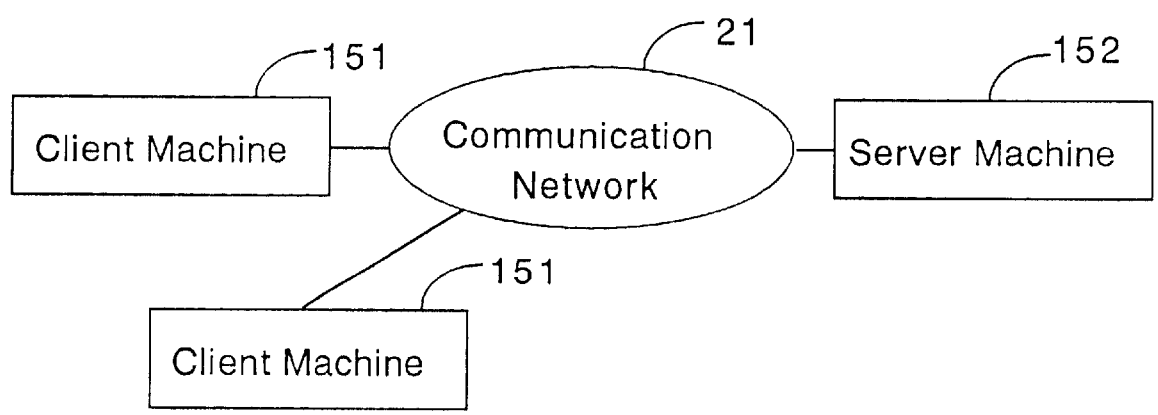
FIG. 13 is a connection chart illustrating a system structure of a fifth embodiment of the musical performance evaluating apparatus according to the present invention.

The first through fourth embodiments explained above are practiced by executing a processing program for performance evaluation in a dedicated electronic musical instrument including a tone generator and an automatic performance function (with a data processor) as shown in FIG. 3 or in a personal computer connected with such an electronic musical instrument. These embodiments can also be practiced by executing a processing program for performance evaluation and a program for processing musical tone signals with an automatic performance function in a personal computer equipped with a DAC and having an installed CODEC driver. Namely, these embodiments realize the whole functions of performance evaluation, and more specifically, a function of inputting music piece data containing performance data for evaluation, a function of inputting user's manual performance, a function of designating evaluation report outputting conditions, a function of evaluating a manual performance, and a function of outputting an evaluation report, on a stand-alone electronic musical instrument or on a personal computer or on a combined system of the two. Alternative to the above, these functions may be shared between a server machine and a client machine connected with each other via a communication network to fulfill the consolidated entire functions. FIG. 13 shows a connection chart illustrating such a system structure constituting a fifth embodiment of the musical performance evaluating apparatus according to the present invention. The system is comprised of client machines (may be one or more) 151 and a server machine 152 connected via a communication network 21. A description will be hereunder made with respect to an example of a performance evaluation system as a kind of network education, in which a server machine 152 takes the roll of an evaluator (tutor) and a client machine 151 takes the roll of a user pupil). The communication network 21 may be a LAN, a telephone network, Internet, or else. The server machine 152 may be a general-type network server including a CPU, a bus, memories, external storage devices, a keyboard, a display, a communication interface, and so forth. The client machine 151 may be a dedicated electronic musical instrument including a communication interface 22 and a tone generator 27, or a personal computer connected with such a dedicated electronic musical instrument, or a personal computer equipped with a DAC and having an installed CODEC driver, or else. The above-enumerated personal computer may be replaced by a cell phone terminal or an telephone terminal equipped with a display device, input manipulators and other necessary functions.

In the client/server system, an entire set of functions, more particularly, a function of inputting performance manipulations, a function of designating evaluation report outputting conditions, a function of inputting music piece data, a function of evaluating performances and a function of outputting an evaluation report are shared between the server machine 152 and the client machine 151 to realize the performance evaluation function as a whole. The respective specific functions for the performance evaluation are the same as those included in the first through fourth embodiments. The present invention can provide multiple types of performance evaluation systems from an architectural point of view according to which function is shared by which element in the system. Various systems can be selectively configured in response to a mode selection by a mode selecting switch.

A first specific example of the system architecture comprises a client machine or machines covering the function of inputting the user's performance manipulations, the function of designating the evaluation report outputting conditions, the function of evaluating the user's performance and the function of outputting the evaluation report, and a server machine covering the function of inputting the music piece data. This type of function sharing corresponds to the case mentioned in connection with FIG. 3 in which various data including tone color data and music piece data sets are downloaded from a server machine. In this type of system, however, the playback of a music piece performance may not necessarily be started after the completion of downloading the music piece data for the intended piece of music into the memory (i.e. the RAM 23, the external storage device 20 (hard disk), or else, but may also be conducted in a streaming fashion, or in a one-after-another fashion like several measures after other several measures by reading the music piece data from the server to store in the storage device in advance to be in time for the actual manual performance of the user.

In this architecture, if the user at the client machine selects a mode in which the musical tones of the performance part of which the user inputs a manual performance will not be generated (sounded), the performance data of such a performance part in the music piece data may not be transmitted to the client machine. But, if it is intended to generate and sound the musical tones of such a performance part of which the user inputs performance manipulations, or if it is intended to guide the keyboard manipulation (fingering) by lighting the light emitting diodes arranged in line with the keys or built in the switch manipulating buttons in the keyboard device (14 in FIG. 3) using the performance data of such a performance part to be performance data for evaluation, or if it is intended to display the music score at a region in the vicinity of the current performing time point on the LCD screen (18 in FIG. 3), the music piece data of such a performance part are to be transmitted to the client machine.

A second specific example of the system architecture comprises a client machine or machines covering the function of inputting the music piece data, the function of inputting the user's performance manipulations and the function of designating the evaluation report outputting conditions, and a server machine covering the function of evaluating the user's performance and the function of outputting the evaluation report. In this type of system architecture, the user sends a music piece data for evaluation and the user's performance manipulation data from the client machine to the server machine and commands the server machine to evaluate the user's performance in comparison to the music piece data (as the reference), and designates the evaluation report output conditions. In this case, the user does not need to send the whole music piece data to the server machine. Only the music piece data for the evaluation part will suffice.

A third specific example of the system architecture comprises a client machine or machines covering the function of inputting the user's performance manipulations and the function of designating the evaluation report outputting conditions, and a server machine covering the function of inputting the music piece data, the function of evaluating the user's performance and the function of outputting the evaluation report. In this type of system architecture, the server machine does not need to send the entire music piece data or the music piece data of the evaluation part about which the user inputs the performance manipulations, depending on the mode selected at the client machine as in the case of the first system architecture. In this case, the music piece data for an entire music piece may be downloaded as a whole or may be transmitted from the server to the client for a streaming playback or in small divisions of data in succession. The third type of system architecture will be described hereinbelow as a fifth embodiment of the present invention by reference to specific flow charts of FIGS. 14a and 14b.

FIGS. 14a and 14b show flow charts describing examples of operations in the fifth embodiment of the present invention, in which FIG. 4a illustrates the functions at the client machine 151 and FIG. 4b illustrates the functions at the server machine 152. The performance evaluation program is started at the client machine 151. When the user wants his/her performance manipulations to be evaluated, he/she accesses the servermachine 152 at a step S161 (FIG. 14a ). For example, the user dials up the provider and designates the URL (uniform resource locator) of the server machine 152 to connect to the server machine 152. Then, the server machine 152 detects the access from the client machine 151 at a step S181, and is connected to the client machine 151. Then, the servermachine 152 transmits a list of available music pieces and evaluation parts at a step S182. The client machine 151 receives the list of music pieces and evaluation parts and displays the list and the LCD screen (18 of FIG. 3) at a step S162. At step S163, the user selects a music piece and a part about which the user's performance manipulations are to be evaluated and inputs the selected music piece and evaluation part, and also inputs a command to play back the music piece, and the client machine 151 transmits the users selection and command to the server machine 152. The server machine 152 receives, at a step S183, the information about the selected music piece and evaluation part, and the command to start playback of the music piece. Next at a step S184, the server machine 152 reads out the performance data of the selected music piece from the memory containing the music piece data base, and transmits the read-out music piece data successively to the client machine 151. The performance data of the evaluation part among the read-out music piece data are to be used at the server side as the comparison reference for the performance evaluation.

The client machine 151 receives, at a step S164, the music piece data from the server 152 and stores the same in the storage device (e.g. the RAM 23 or a hard disk in the external storage device 20 of FIG. 3). The tone generator (e.g. 27 in FIG. 3) generates musical tone signals based on the received music piece data, and the sound system (e.g. 28 in FIG. 3) emits audible sounds. The user manipulates the keys in the keyboard (e.g. 14 in FIG. 3) along with the progression of the music hearing the emitted sounds. A guide for performance manipulations (i.e. fingering guide) may be indicated by means of light emitting diodes or an LCD screen based on the music piece data of the evaluation part. Then, the user can manipulate the keyboard following such indications. At a step S165, the client machine 151 creates the inputted performance data according to the user's performance operations, and transmits the same to the server 152.

There may be a chance that the switch to designate the condition of whether the evaluation report is to be outputted with respect to the user's performance manipulations in the midst of the playback. A step S166 is to cope with such a situation. The step S166 judges whether there is an actuation of the switch commanding the conditions of whether to output an evaluation report on the user's performance operations. If there is such an actuation, the process goes forward to a step S167, and if there is no such actuation, the process skips to a step S168. The step S167 transmits information about the evaluation report outputting condition, before the process proceeds to the step S168. The step S168 judges whether the received music piece data is over, and if the judgment is affirmative (yes), the process moves to a step S169, and if the judgment is negative (no), the process goes back to the step S164 to keep receiving the music piece data and the processing through the above-mentioned steps is repeated. The end of the music piece data may be determined by detecting the user's operation for stopping the readout of the music piece data. Additionally, the finish of the performance manipulation inputs, i.e. the fact that the inputted performance manipulation data have not been received for more than a predetermined period of time may be detected. In both of the cases, the information showing the end of manipulation may better be transmitted to the server 152 to stop reading out the music piece data. If the processing flow is to be suspended to a standby state at the step S168 when the music piece data is over, the step S169 may not be provided in the flow. In such a situation, a step S170 may be simply executed when a evaluation report is received under the standby condition.

The server machine 152 receives, at a step S185, the inputted performance data and information on the evaluation report outputting condition about whether to output an evaluation report on the performance operations. Next at a step S186, the server 152 compares the received inputted performance data with the performance data of the evaluation part temporarily stored in the server memory, and evaluates the user's performance operations. A step S187 judges whether the music piece data is over. If the judgment is affirmative (yes), the process goes to a step S188, and if the judgment is negative (no), the process goes back to the step S184 to read out the selected music piece data from the memory, repeating the above described process flow. The finish of the music piece data is determined by detecting the end of reading out the music piece data from the memory, or by detecting the receipt of stopping operation notice as the user commands to stop the readout of the music piece data. In addition, the detection may be made as to the finish of the inputted performance data, i.e. the fact that the inputted performance data have not been received for more than a predetermined period of time. In this situation, the readout of the music piece data may preferably be terminated also.

A step S188 judges whether it is under the condition that an evaluation report is to be outputted. Where the condition is that the report is to be outputted, the process goes forward to a step S189 to transmit to the client machine 151 the evaluation report about the user's performance operations as calculated at the step S186. Where the condition is that the report is not to be outputted, the process is ended and goes back to the standby state for an access from the client machine. Also at the client machine 151, a judgment is made at a step S168 as to whether it is under the condition to output an evaluation report. Where the condition is that the report is to be outputted, the process moves forward to a step S170 to receive the evaluation report and displays the same on the LCD screen (e.g. 18 of FIG. 3). Where the condition is that the report is not to be outputted, the process comes to an end.

Alternatively, the judgment at the step S166 as to whether there is a switch actuation commanding the conditions of whether to output an evaluation report on the user's performance operations may be replaced by a judgment as to where there is any operation by the user to designate an evaluation report output span or spans, also reading out the evaluation report output span designating data memory. In such a situation, the step S167 may transmit information about the evaluation report output span or spans. The server machine 152 receives the information at the step S185, and transmits the evaluation report with respect to the designated evaluation report output span or spans to the client 151 at the step S189. The client machine 151 displays the evaluation report about the designated evaluation report output span or spans at the step S170. In the case of the evaluation system according to the first or the second embodiment, the steps S168 and S187 are to be modified accordingly for a proper detection of the finish of the user's performance operations. The detection manner will be adequately different depending on whether the performance data of the user's operations are to be transmitted in real time along the progression of the music piece or the performance data of the user's operations are to be transmitted in a batch for one piece of music after the performance operations are completed. In any case, the judgment will be made after the finish of the performance operations as to whether the evaluation report outputting condition designating device is designating the condition of outputting the evaluation report, and the evaluation report will be outputted when the designating device designates to output the report. The control operation for transmitting the information on evaluation report outputting conditions or the information on evaluation report output spans may be conducted after the performance is over, as long as the control operation is in time for outputting the evaluation report after the performance.

The program for executing the steps S161–S170 is stored in the storage device (e.g. the ROM 24 or the hard disk in the external storage device 20 of FIG. 3) of the client machine 151. In the case where the program is to be stored in the hard disk of the external storage device 20, the program will be installed into the hard disk from a CD-ROM or will be downloaded from the server 152 via the communication network 21. The program for executing the steps S181–S189 is stored in the storage device (not shown) of the server machine 152. In the case that the server machine 152 is a WWW (World Wide Web) server, the steps S161–S170 at the client machine 151 will be executed as plug-in software of the WWW browser software. Alternatively, the server machine 152 may transmits the music piece data and a Java applet of evaluation program to the client machine 151, and the client machine 151 executes the series of performance evaluation steps based on the received Java applet of evaluation program. Although the above description has been made in connection with the server machine 152 on the Internet, the performance evaluation system may be architected with a plurality of machines connected on a LAN by setting one of the machines as the server and others as the clients.

As described in detail hereinabove, the present invention permits various settings for outputting an evaluation report so that the user can arbitrarily have an evaluation report in the midst of the playback of the music piece or after the playback is over. The user can therefore obtain an evaluation report about the skill degrees of the performance manipulations at intended times according to his/her desire by simple operations. Further, in the case the user has forgotten to designate, at the start of the playback, the output of an evaluation report, the user can designate the same in the midst of the playback of the music piece, and therefore, the user does not need to restart the playback of the music piece and the manual performance operations from the beginning. Additionally, according to the present invention, the user can get evaluation scores about any partial spans by selectively designating such intended spans, even after the user has inputted the entire music piece performance, and therefore, the user does not have to input chopped performance spans at which he/she is not good at playing and wants to make repeated practice. The user can recognize his/her performance skill about any intended fractional span.

While particular embodiments of the invention and particular modification have been described, it will, of course, be understood by those skilled in the art that various modifications and substitutions may be made without departing from the spirit of the present invention so that the invention is not limited thereto, since further modifications may be made by those skilled in the art, particularly in light of the foregoing teachings. It is therefore contemplated by the appended claims to cover any such modifications that incorporate those features of these improvements in the true spirit and scope of the invention.

What is claimed is:

1. A musical performance evaluating apparatus comprising:

a reference performance data providing device which provides a reference performance data representing a musical performance as a reference for evaluation;

a manual performance input device for inputting manual performance operations by a user and outputting manual performance data representing the inputted performance operations to be evaluated;

an evaluation device which compares said manual performance data with said reference performance data;

an evaluation report output device which outputs an evaluation report based on the comparison by said evaluation device;

an evaluation report outputting condition designating device which designates a condition whether to output an evaluation report according to a control operation by the user; and an evaluation report control device which controls said evaluation report output device to output said evaluation report after said performance operations have finished and when said evaluation report outputting condition designating device is designating the condition to output an evaluation report;

wherein the evaluation report control device determines the condition designated by said evaluation report outputting condition designating device after the said performance operations have finished.

2. A musical performance evaluating apparatus as claimed in claim 1, wherein said reference performance data providing device includes: a music piece data memory which stores music piece data including said reference performance data; and a music piece data readout device which reads out said music piece data including said reference performance data successively from said music piece data memory to play back said reference performance.

3. A musical performance evaluating apparatus as claimed in claim 2, wherein said evaluation report outputting condition designating device holds said designated condition according to said control operation every time there is a control operation.

4. A musical performance evaluating apparatus as claimed in claim 1, wherein said reference performance data providing device includes a music piece data inputting device for inputting music piece data including said reference performance data.

5. A storage medium for use in an apparatus for evaluating a musical performance, said apparatus being of a data processing type comprising a computer, said medium containing a program that is executable by the computer, the program comprising:

a module for providing a reference performance data representing a musical performance as a reference for evaluation;

a module for inputting manual performance operations by a user and outputting manual performance data representing the inputted performance operations to be evaluated;

a module for comparing said input performance data with said reference performance data;

a module for outputting an evaluation report based on the comparison by said comparing module;

a module for designating a condition whether to output an evaluation report according to a control operation by the user; and a module for controlling the function of said outputting module to output said evaluation report after said performance operations have finished and when said designating module is designating the condition to output an evaluation report;

wherein the module for controlling the function of said outputting module determines the condition designated by said module for designating a condition after the said performance operations have finished.

6. A method for evaluating a musical performance comprising;

a step of providing reference performance data representing a musical performance as a reference for evaluation;

a step of inputting manual performance operations by a user and outputting manual performance data representing the inputted performance operations to be evaluated;

a step of comparing said manual performance data with said reference performance data;

a step of designating a condition whether to output an evaluation report according to a control operation by the user; and a step of outputting an evaluation report based on the comparison made at said comparing step when the condition designated at said designating step indicates an evaluation report should be generated after the said performance operations have finished;

wherein the step of outputting an evaluation report includes determining the condition designated after said performance operations have finished.

7. A server apparatus for evaluating a musical performance comprising:

a connecting device for connecting said server apparatus to a communication network to be available for an access from a client apparatus;

a reference performance data providing device which provides reference performance data representing a musical performance as a reference for evaluation;

a manual performance input device which receives, via said connecting device, a manual performance data representing inputted performance operations at the client apparatus;

an evaluation device which compares said manual performance data with said reference performance data;

an evaluation report output device which outputs an evaluation report based on the comparison by said evaluation device;

an evaluation report outputting condition designating device which designates a condition whether to output an evaluation report;

an evaluation report output control device which controls said evaluation report output device to output said evaluation report after said performance operations have finished and when said evaluation report outputting condition designating device is designating the condition to output an evaluation report, wherein the evaluation report control device determines the condition designated by said evaluation report outputting condition designating device after the said performance operations have finished;

an evaluation report transmitting device which transmits said evaluation report to said client via said connecting device.

8. A server apparatus as claimed in claim 7, wherein said reference performance data providing device includes a music piece data inputting device for inputting a music piece data including said reference performance data.

9. A client apparatus for evaluating a musical performance comprising:

a connecting device for connecting said client apparatus to a communication network to access a server apparatus;

a reference performance data inputting device for inputting a music piece data including a reference performance data representing a musical performance as a reference for evaluation;

a manual performance input device for inputting manual performance operations by a user and outputting manual performance data representing the inputted performance operations to be evaluated;

a manual performance data outputting device which outputs said manual performance data to said communication network via said connecting device;

an evaluation report outputting condition designating device which designates a condition whether to output an evaluation report according to a control operation by the user, and outputs information about the designated condition to said communication network via said connecting device such that said server apparatus outputs an evaluation report with respect to said manual performance data compared against said reference performance data after said performance operations have finished and when said information about the designated condition is designating the condition to output an evaluation report, wherein the server apparatus determines the condition designated by said evaluation report outputting condition designating device after said performance operations have finished; and an evaluation report receiving device which receives said evaluation report from said server apparatus via said connecting device.

10. A client apparatus for evaluating a musical performance comprising:

a connecting device for connecting said client apparatus to a communication network to access a server apparatus;

a reference performance data receiving device for receiving via said connecting device a music piece data including a reference performance data representing a musical performance as a reference for evaluation;

a manual performance input device for inputting manual performance operations by a user and outputting manual performance data representing the inputted performance operations to be evaluated;

a manual performance data outputting device which outputs said manual performance data to said communication network via said connecting device;

an evaluation report outputting condition designating device which designates a condition whether to output an evaluation report according to a control operation by the user, and outputs information about the designated condition to said communication network via said connecting device such that said server apparatus outputs an evaluation report with respect to said manual performance data compared against said reference performance data after said performance operations have finished and when said information about the designated condition is designating the condition to output an evaluation report, wherein the server apparatus determines the condition designated by said evaluation report outputting condition designating device after the said performance operations have finished; and an evaluation report receiving device which receives said evaluation report from said server apparatus via said connecting device.

11. A storage medium for use in a client apparatus for evaluating a musical performance, said apparatus being of a data processing type comprising a computer and having a connecting device to connect said apparatus to a communication network, said medium containing a program that is executable by the computer, the program comprising:

a module for connecting said client apparatus to a communication network to access a server apparatus;

a module for receiving via said connecting device a music piece data including a reference performance data representing a musical performance as a reference for evaluation;

a module for inputting manual performance operations by a user and outputting manual performance data representing the inputted performance operations to be evaluated;

a module for outputting said manual performance data to said communication network via said connecting device;

a module for designating a condition whether to output an evaluation report according to a control operation by the user, and outputting information about the designated condition to said communication network via said connecting device such that said server apparatus outputs an evaluation report with respect to said annual performance data compared against said reference performance data after said performance operations have finished and when said information about the designated condition is designating the condition to output an evaluation report, where in the server apparatus determines the condition designated by said module for designating a condition after said performance operations have finished; and a module for receiving said evaluation report from said server apparatus via said connecting device.

12. A method for evaluating a musical performance on a client apparatus having a connecting device for connecting said client apparatus to a communication network, said method comprising:

a step of connecting said client apparatus to a communication network to access a server apparatus;

a step of receiving via said connecting device a music piece data including a reference performance data representing a musical performance as a reference for evaluation;

a step of inputting manual performance operations by a user and outputting manual performance data representing the inputted performance operations to be evaluated;

a step of output ting said manual performance data to said communication network via said connecting device;

a step of designating a condition whether to output an evaluation report according to a control operation by the user, and outputting information about the designated condition to said communication network via said connecting device such that said server apparatus outputs an evaluation report with respect to said manual performance data compared against said reference performance data after said performance operations have finished and when said information about the designated condition is designating the condition to output an evaluation report, wherein the server apparatus determines the condition designated by said step of designating a condition after said performance operations have finished; and a step of receiving said evaluation report from said server apparatus via said connecting device.

13. A musical performance evaluating apparatus comprising:

a reference performance data providing device which provides a reference performance data representing a musical performance as a reference for evaluation;

a manual performance input device for inputting manual performance operations by a user and outputting manual performance data representing the inputted performance operations to be evaluated;

an evaluation device which compares said manual performance data with said reference performance data over an evaluation part span;

an evaluation report output device which outputs an evaluation report based on the comparison by said evaluation device;

an evaluation report output span condition designating device which designates at least one evaluation report output span about which an evaluation of said manual performance operations are to be made within a portion of the length of said evaluation part span; and an evaluation report control device which controls said evaluation report output device to output said evaluation report with respect to said at least one evaluation report output span after said performance operations have finished.

14. A musical performance evaluating apparatus as claimed in claim 13, wherein said reference performance data providing device includes: a music piece data memory which stores music piece data including said reference performance data; and a music piece data readout device which reads out said music piece data including said reference performance data successively from said music piece data memory to play back said reference performance.

15. A musical performance evaluating apparatus as claimed in claim 14, wherein said evaluation report output span designating device includes: an evaluation span designating data memory which stores data for designating evaluation report output spans; and an evaluation span designating data readout device which reads out said data for designating evaluation report output spans successively from said evaluation span designating data memory.

16. A musical performance evaluating apparatus as claimed in claim 14, wherein said evaluation report output span designating device is capable of designating said evaluation report output spans according to control by the user in the midst of the successive readout of said music piece data.

17. A musical performance evaluating apparatus as claimed in claim 14, wherein said evaluation report output span designating device is capable of designating said evaluation report output spans according to control by the user after the successive readout of said music piece data has finished.

18. A musical performance evaluating apparatus as claimed in claim 13, wherein said reference performance data providing device includes a music piece data inputting device for inputting music piece data including said reference performance data.

19. A storage medium for use in an apparatus for evaluating a musical performance, said apparatus being of a data processing type comprising a computer, said medium containing a program that is executable by the computer, the program comprising:

a module for providing a reference performance data representing a musical performance as a reference for evaluation;

a module for inputting manual performance operations by a user and outputting manual performance data representing the inputted manual performance operations to be evaluated;

a module for comparing said manual performance data with said reference performance data over an evaluation part span;

a module for outputting an evaluation report based on the comparison by said comparing module;

a module for designating at least one evaluation report output span about which an evaluation of said inputted manual performance operations are to be made within a portion of the length of said evaluation part span; and a module for controlling the function of said outputting module to output said evaluation report with respect to said at least one evaluation report output span after said performance operations have finished.

20. A method for evaluating a musical performance comprising:

a step of providing a reference performance data representing a musical performance as a reference for evaluation;

a step of inputting manual performance operations by a user and outputting manual performance data representing the inputted performance operations to be evaluated;

a step of comparing said manual performance data with said reference performance data over an evaluation part span;

a step of outputting an evaluation report based on the comparison by said comparing step;

a step of designating at least one evaluation report output span about which an evaluation of said inputted manual performance operations are to be made within a portion of the length of said evaluation part span; and a step of controlling the function of said outputting module to output said evaluation report with respect to said at least one evaluation report output span after said performance operations have finished.

21. A server apparatus for evaluating a musical performance comprising:

a connecting device for connecting said server apparatus to a communication network to be available for an access from a client apparatus;

a music piece data inputting device for inputting a music piece data including reference performance data representing a musical performance as a reference for evaluation;

a manual performance data receiving device which receives, via said connecting device, a manual performance data representing inputted performance operations at the client apparatus;

an evaluation device which compares said manual performance data with said reference performance data over a evaluation part span;

an evaluation report output device which outputs an evaluation report based on the comparison by said evaluation device;

an evaluation report output span designating device which designates at least one evaluation report output span about which an evaluation of said inputted performance operations are to be made within the length of said evaluation part span;

an evaluation report output control device which controls said evaluation report output device to output said evaluation report with respect to said at least one evaluation report output span after said performance operations have finished; and an evaluation report transmitting device which transmits the outputted evaluation report to said communication network via said connecting device.

22. A client apparatus for evaluating a musical performance comprising:

a connecting device for connecting said client apparatus to a communication network to access a server apparatus;

a reference performance data receiving device for receiving via said connecting device a music piece data including a reference performance data representing a musical performance as a reference for evaluation;

a manual performance input device for inputting manual performance operations by a user and outputting manual performance data representing the inputted performance operations to be evaluated;

a manual performance data outputting device which outputs said manual performance data to said communication network via said connecting device;

an evaluation report output span designating device which designates at least one evaluation report output span about which an evaluation of said inputted performance operations are to be made within a portion of a length of an evaluation part during which said manual performance data is compared with said reference performance data, and outputs information about said at least one designated span to said communication network via said connecting device such that said server apparatus outputs an evaluation report with respect to said manual performance data compared against said reference performance data; and an evaluation report receiving device which receives said evaluation report via said connecting device after said performance operations have finished.

23. A storage medium for use in a client apparatus for evaluating a musical performance, said apparatus being of a data processing type comprising a computer and having a connecting device to connect said apparatus to a communication network, said medium containing a program that is executable by the computer, the program comprising:

a module for connecting said client apparatus to a communication network to access a server apparatus;

a module for receiving via said connecting device a music piece data including a reference performance data representing a musical performance as a reference for evaluation;

a module for inputting manual performance operations by a user and outputting manual performance data representing the inputted performance operations to be evaluated;

a module for outputting said manual performance data to said communication network via said connecting device;

a module for designating at least one evaluation report output span about which an evaluation of said inputted performance operations are to be made within a portion of a length of an evaluation part during which said manual performance data is compared with said reference performance data the length of said reference musical performance, and for outputting information about said at least one designated span to said communication network via said connecting device such that said server apparatus outputs an evaluation report with respect to said manual performance data compared against said reference performance data; and a module for receiving said evaluation report from said server apparatus via said connecting device.

24. A method for evaluating a musical performance on a client apparatus having a connecting device for connecting said client apparatus to a communication network, said method comprising:

a step of connecting said client apparatus to a communication network to access a server apparatus;

a step of receiving via said connecting device a music piece data including a reference performance data representing a musical performance as a reference for evaluation;

a step of inputting manual performance operations by a user and outputting manual performance data representing the inputted performance operations to be evaluated:

a step of outputting said manual performance data to said communication network via said connecting device;

a step of designating at least one evaluation report output span about which an evaluation of said inputted performance operations are to be made within a portion of a length of an evaluation part during which said manual performance data is compared with said reference performance data the length of said reference musical performance, and for outputting information about said at least one designated span to said communication network via said connecting device such that said server apparatus outputs an evaluation report with respect to said manual performance data compared against said reference performance data;

a step of receiving said evaluation report from said server apparatus via said connecting device.

25. A musical performance evaluating apparatus comprising:

a reference performance data providing device which provides a reference performance data representing a musical performance as a reference for evaluation;

a playback device which plays back said reference performance data to present a reference performance;

a manual performance input device for inputting manual performance operations by a user in tempo with said reference performance, and outputting manual performance data representing the inputted performance operations to be evaluated;

an evaluation device which compares said manual performance data with said reference performance data;

an evaluation report output device which outputs an evaluation report based on the comparison by said evaluation device;

an evaluation report outputting condition designating device which designates a condition whether to output an evaluation report according to a control operation by the user; and an evaluation report output control device which controls said evaluation report output device to output said evaluation report after said performance operations have finished and when said evaluation report outputting condition designating device is designating the condition to output an evaluation report;

wherein the evaluation report control device determines the condition designated by said evaluation report outputting condition designating device after the said performance operations have finished.

* * * * *